(12) United States Patent
Grider

(10) Patent No.: US 11,194,763 B1
(45) Date of Patent: Dec. 7, 2021

(54) SCALABLE AUGMENTED ENUMERATION AND METADATA OPERATIONS FOR LARGE FILESYSTEMS

(71) Applicant: Los Alamos National Security, LLC, Los Alamos, NM (US)

(72) Inventor: Gary A. Grider, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 221 days.

(21) Appl. No.: 15/713,495

(22) Filed: Sep. 22, 2017

Related U.S. Application Data

(60) Provisional application No. 62/401,766, filed on Sep. 29, 2016.

(51) Int. Cl.
 *G06F 16/00* (2019.01)
 *G06F 16/14* (2019.01)
 (Continued)

(52) U.S. Cl.
 CPC ............ *G06F 16/14* (2019.01); *G06F 16/134* (2019.01); *G06F 16/162* (2019.01); *G06F 16/1767* (2019.01); *G06F 16/2246* (2019.01)

(58) Field of Classification Search
 CPC .. G06F 16/182; G06F 16/1865; G06F 16/119; G06F 16/148; G06F 16/1827;
 (Continued)

(56) References Cited

U.S. PATENT DOCUMENTS 7,284,011 B1 * 10/2007 Narayanaswamy .. G06F 16/283
 707/700
7,529,740 B2 * 5/2009 Chang ..................... G06F 16/35
 (Continued)

OTHER PUBLICATIONS

Bent, et al., "PLFS: A Checkpoint Filesystem for Parallel Applications," Association for Computing Machinery, 2009, pp. 1-12 (also published as Bent, et al. "PLFS: A Checkpoint Filesystem for Parallel Applications" in *Proc. of Conf. on High Performance Computing Networking, Storage and Analysis*, Article No. 21, pp. 1-12 (Nov. 14-20, 2009)).

(Continued)

*Primary Examiner* — Michelle N Owyang
(74) *Attorney, Agent, or Firm* — Klarquist Sparkman, LLP

(57) ABSTRACT

Systems, apparatus, and methods are disclosed for performing scalable operations in a file system. Metadata entries in a namespace or directory tree are sharded across multiple file metadata servers. An augmented enumeration operation, such as listing a directory, is parallelized across the multiple file metadata servers, transparently to clients. Exemplary augmentation features can include filtering and sorting. Augmentation features can be executed concurrently with enumeration, prior to enumeration, after enumeration, or as a combination of these, and can utilize pre-built index structures or holding structures for intermediate results. Augmented enumeration operations can also include no-output operations such as changing file attributes or deleting a file, and cumulative operations such as counting total disk space usage. The parallelization is compatible with tree-level parallelization and storage-level parallelization. Disclosed technologies can be applied to other fields requiring scalable enumeration, such as database and network applications.

16 Claims, 11 Drawing Sheets

(51) Int. Cl.
*G06F 16/13* (2019.01)
*G06F 16/16* (2019.01)
*G06F 16/176* (2019.01)
*G06F 16/22* (2019.01)

(58) Field of Classification Search
CPC ........ G06F 16/183; G06F 16/27; G06F 16/14; G06F 16/162; G06F 16/1767; G06F 16/2246; G06F 16/134
USPC .................................................. 707/600–899
See application file for complete search history.

(56) References Cited

U.S. PATENT DOCUMENTS

| | | | | |
|---|---|---|---|---|
| 7,653,668 | B1* | 1/2010 | Shelat | G06F 16/184 |
| | | | | 707/610 |
| 8,341,130 | B2* | 12/2012 | Kaplan | G06F 16/176 |
| | | | | 707/694 |
| 8,364,723 | B1 | 1/2013 | Hseush et al. | |
| 8,825,652 | B1 | 9/2014 | Faibish et al. | |
| 8,868,576 | B1 | 10/2014 | Faibish et al. | |
| 8,949,255 | B1 | 2/2015 | Faibish et al. | |
| 9,069,778 | B1 | 6/2015 | Bent et al. | |
| 9,087,075 | B1 | 7/2015 | Faibish et al. | |
| 9,122,700 | B2 | 9/2015 | Grider et al. | |
| 9,165,014 | B1 | 10/2015 | Faibish et al. | |
| 9,183,211 | B1 | 11/2015 | Bent et al. | |
| 9,245,048 | B1 | 1/2016 | Bent et al. | |
| 9,298,733 | B1 | 3/2016 | Faibish et al. | |
| 9,317,521 | B1 | 4/2016 | Bent et al. | |
| 9,569,459 | B1 | 2/2017 | Strauss et al. | |
| 9,767,107 | B1 | 9/2017 | Bent et al. | |
| 9,779,015 | B1 | 10/2017 | Oikarinen et al. | |
| 10,140,304 | B1* | 11/2018 | Bent | G06F 16/13 |
| 10,540,230 | B2* | 1/2020 | Dhuse | G06F 3/0635 |
| 10,949,387 | B1 | 3/2021 | Grider | |
| 2002/0156891 | A1 | 10/2002 | Ulrich et al. | |
| 2002/0194523 | A1 | 12/2002 | Ulrich et al. | |
| 2004/0133606 | A1* | 7/2004 | Miloushev | G06F 16/1824 |
| 2005/0149213 | A1 | 7/2005 | Guzak et al. | |
| 2007/0174309 | A1* | 7/2007 | Pettovello | G06F 16/2246 |
| 2010/0115011 | A1 | 5/2010 | Callahan et al. | |
| 2010/0198849 | A1* | 8/2010 | Thomas | G06F 16/2358 |
| | | | | 707/758 |
| 2012/0197958 | A1* | 8/2012 | Nightingale | G06F 9/5027 |
| | | | | 709/201 |
| 2013/0198148 | A1 | 8/2013 | Chambliss et al. | |
| 2013/0247190 | A1 | 9/2013 | Spurlock | |
| 2014/0006363 | A1 | 1/2014 | Constantinescu et al. | |
| 2014/0282615 | A1 | 9/2014 | Cavage et al. | |
| 2015/0244795 | A1* | 8/2015 | Cantwell | G06F 16/27 |
| | | | | 709/202 |
| 2015/0347553 | A1* | 12/2015 | Aizman | G06F 16/185 |
| | | | | 713/189 |
| 2016/0072814 | A1 | 3/2016 | Martinelli | |
| 2016/0381138 | A1 | 12/2016 | Bent et al. | |
| 2017/0031783 | A1 | 2/2017 | Kedem et al. | |
| 2017/0322996 | A1* | 11/2017 | Horowitz | G06F 16/278 |
| 2017/0344597 | A1* | 11/2017 | Wang | G06F 16/182 |
| 2018/0145983 | A1* | 5/2018 | Bestler | H04L 9/3236 |
| 2020/0125493 | A1 | 4/2020 | Bent et al. | |

OTHER PUBLICATIONS

Github.com, "mar-file-system / marfs," downloaded from https://github.com/mar-file-system/marfs, retrieved Sep. 20, 2017, 1 page.
Github.com, "marfs /Documentation /" downloaded from https://github.com/mar-file-system/marfs/tree/master/Documentation, retrieved Sep. 20, 2017, 1 page.
Nunez, "Multi-Dimensional Hashed Indexed Metadata/Middleware (MDHIM) Project," Ultrascale Systems Research Center, High Performance Computing Systems Integration, Los Alamos National Laboratory, May 10, 2012, 42 pages.
"Standard for Informative Technology—Portable Operating System Interface (POSIX®) The Base Specifications Issue 6," IEEE Std 1003.1-2004, Open Group Technical Standard Base Specifications, Issue 6, pp. 1-3762 (2004).

* cited by examiner

SCALABLE AUGMENTED ENUMERATION AND METADATA OPERATIONS FOR LARGE FILESYSTEMS

CROSS-REFERENCE TO RELATED APPLICATIONS

This application claims the benefit of U.S. Provisional Application No. 62/401,766, entitled "SCALABLE FILESYSTEM ENUMERATION AND METADATA OPERATIONS," filed Sep. 29, 2016, which is incorporated by reference herein in its entirety.

ACKNOWLEDGMENT OF GOVERNMENT SUPPORT

This invention was made with government support under Contract No. DE-AC52-06NA25396 awarded by the U.S. Department of Energy. The government has certain rights in the invention.

BACKGROUND

Volumes of data, numbers of files, logical sizes of storage systems, and numbers of applications, are all increasing rapidly. Considerable effort has gone into developing tools for large storage systems, including distributed file systems and parallel file systems. Much of the effort has been spent on developing efficiency on the data side of storage operations, for example optimizing reading and writing of file contents and developing scalable implementations of such operations. However, in many filesystems of interest, operations on the directory side of storage operations, such as merely listing a directory, have not been implemented in a scalable way.

Flat filesystem organization is incompatible with decades of application development that assumes hierarchical models of file organization, and expectations of certain widely used features often captured under the label of POSIX compliance.

Directory reading is presently accomplished serially. Such serial operations do not scale well. Other functions involving traversing a directory are conventionally implemented in similar fashion, and have similar performance issues.

Accordingly, there is ample opportunity to improve operations on POSIX-compliant and other large file systems.

SUMMARY

In certain examples, an enumeration function, such as listing a directory, is performed on target objects in a file system. Entries of the target objects are sharded across a plurality of metadata servers and stored in their respective metadata stores. A computer, such as a primary metadata server, initializes a plurality of data structures, each associated with a respective one of a plurality of metadata servers. The computer invokes a respective enumeration task on each of the plurality of metadata servers, the enumeration tasks to be run in parallel. Each of the plurality of metadata servers uses its data structure and traverses its metadata entries, performing the enumeration function individually with the traversed metadata entries. Each metadata entry represents a corresponding target object of the file system.

In further examples, the computer can receive a command to enumerate objects represented in the file system. The file system can be a POSIX-like file system, and the received command can be a PO SIX command. The traversing action can be performed concurrently with the enumeration function by a metadata server. Two or more metadata servers can perform their respective traversing actions concurrently. The target objects can include one or more of: database entries, database records, directories, files, identifiers, inodes, links, network nodes, pointers, record locators, or symbolic links. The metadata entries can include one or more of: access permissions of the first target object; attributes of the first target object; a checksum; an error-correcting code; an identifier of the first target object; an inode of the first target object; a length of the first target object; a link to data of the first target object; a link to an extension metadata entry for additional metadata associated with the first target object; a location of the first target object; a name of the first target object; ownership of the first target object; one or more of times at which the first target object was archived, backed up, created, modified, or most recently accessed; a security label; or a type of the first target object.

In additional examples, the computer can open a target directory containing one or more of the target objects; at least one metadata server can open its portion of the target directory; subsequently, the computer can instruct one or more metadata servers to close their respective portions of the target directory, and can destage the data structures associate with respective metadata servers; and the metadata servers can close their respective portions of the target directory. Further, a metadata server can maintain an indexing structure and can access this indexing structure to locate a first metadata entry with which to start traversal of metadata entries. The metadata server can access the first metadata entry and can traverse the indexing structure to locate a next metadata entry; the metadata server can repeat the accessing and locating until no next metadata entry is located, thereby completing a traverse of metadata entries. The indexing structure can be used to determine an address at which to commence traversal of metadata entries. A system implementing any of these examples can also include an output channel, and the system can respond to an enumeration command with results of the enumeration delivered over the output channel.

In some examples, an enumeration function performed with a metadata entry of a target object can include one or more of: adding the disk usage of the first target object to a sum, changing one or more properties of the first target object, counting the first target object, deleting the first target object, or listing the first target object.

In certain examples, objects represented in a directory structure are enumerated. A computer, such as a primary metadata server, receives a command to enumerate objects, such as files, represented in the directory structure, and issues respective commands to each of a plurality of associated metadata servers. Each associated metadata server, responsive to its respective command and in parallel, enumerates objects which are represented on that server.

In certain examples, a file system, a directory structure, or a metadata store can be constructed. In response to receiving a command to add a new directory entry, a primary metadata server determines an inode value for the new directory entry, constructs a metadata entry for the new directory, and stores this metadata entry within its own metadata store. A corresponding entry for the new directory can also be made in each of a plurality of associated file metadata servers. In response to receiving a command to add a new file entry, the primary metadata server associates the new file entry with one of the file metadata servers and sends a communication to this file metadata server. Responsive to the communication, the file metadata server determines an inode value for the new file entry and stores a metadata entry corresponding to the new file entry within its metadata store. The second metadata entry can be constructed by the file metadata server, the primary metadata server, or cooperatively by both together. In the first case, the new file entry is made available to the file metadata server, while in the second case, the constructed metadata entry is made available to the file metadata server.

The disclosed innovations are also applicable to augmented enumeration functions that extend basic enumeration functions with augmentation features such as filtering or sorting. In certain examples, a computer receives a first command to perform an augmented enumeration function for a file system, wherein the first command indicates an augmentation feature to be applied to a basic enumeration function. The computer invokes respective augmented enumeration tasks at each of a plurality of metadata servers. The metadata servers traverse their respective metadata entries, each of which represents a corresponding target object of the file system. The metadata servers perform the basic enumeration function for at least one of the traversed metadata entries, and also perform the augmentation function.

In some examples, the augmentation feature can be executed, at least partially, concurrently with the traversing action and/or the basic enumeration function. The augmentation feature can be a filter limiting the target objects to be enumerated. The basic enumeration function can be performed for a traversed metadata entry that satisfies the filter, and can be omitted for a traversed metadata entry that does not satisfy the filter. In some examples, an auxiliary index structure can be populated prior to the invocation of the augmented enumeration task, to facilitate identification of metadata entries for target objects satisfying the filter. During traversal, the auxiliary index structure can be accessed to identify successive metadata entries.

In further examples, the augmentation feature can be a sort indicating an output ordering of results of the basic enumeration function. The augmentation feature can be performed by a metadata server, partially or wholly, after the traversing by the first metadata server has been completed. The results of the basic enumeration function can be stored in a holding data structure, and the augmentation feature can be executed on the stored results in the holding data structure. The holding structure can be a binary balanced tree. Each metadata server can output one or more results of the augmented enumeration function. An output server can receive the individual results, can consolidate the received results, and can output the consolidated results. The consolidated results can be output via an output channel to an output destination.

In certain examples, a system comprises a primary metadata server and a plurality of secondary metadata servers, which are all interconnected by one or more network connections and configured to perform some disclosed technologies including augmented enumeration functions. The primary metadata server receives a first command to perform an augmented enumeration function which indicates an augmentation of a basic enumeration function. The primary metadata server launches parallel augmented enumeration tasks at each of the secondary metadata servers. Responsive to the launching, each secondary metadata server traverses its respective metadata entries, each of which represents a corresponding target object of the file system. The secondary metadata server performs the basic enumeration function on a plurality of the traversed metadata entries, executes the augmentation feature, and outputs one or more results of the augmented enumeration function.

In further examples, prior to receiving the first command, the primary metadata server can receive a second command to add a file entry at a first target location in the file system. The primary metadata server can associate the file entry with a particular secondary metadata server, and can send a communication to this secondary metadata server related to the file entry. Then, the secondary metadata server determines an inode value for the file entry and stores a first metadata entry associated with the file entry in its own metadata store. The secondary metadata server also populates an auxiliary index structure with a second entry associated with the file entry, to facilitate one or more augmentation features. Then, the secondary metadata server can use the auxiliary index structure during execution of the augmentation feature to determine metadata entries to be traversed.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the disclosed technology will become more apparent from the following detailed description, which proceeds with reference to the accompanying figures. As described herein, a variety of other features and advantages can be incorporated into the technologies as desired.

DETAILED DESCRIPTION

Figure 1:
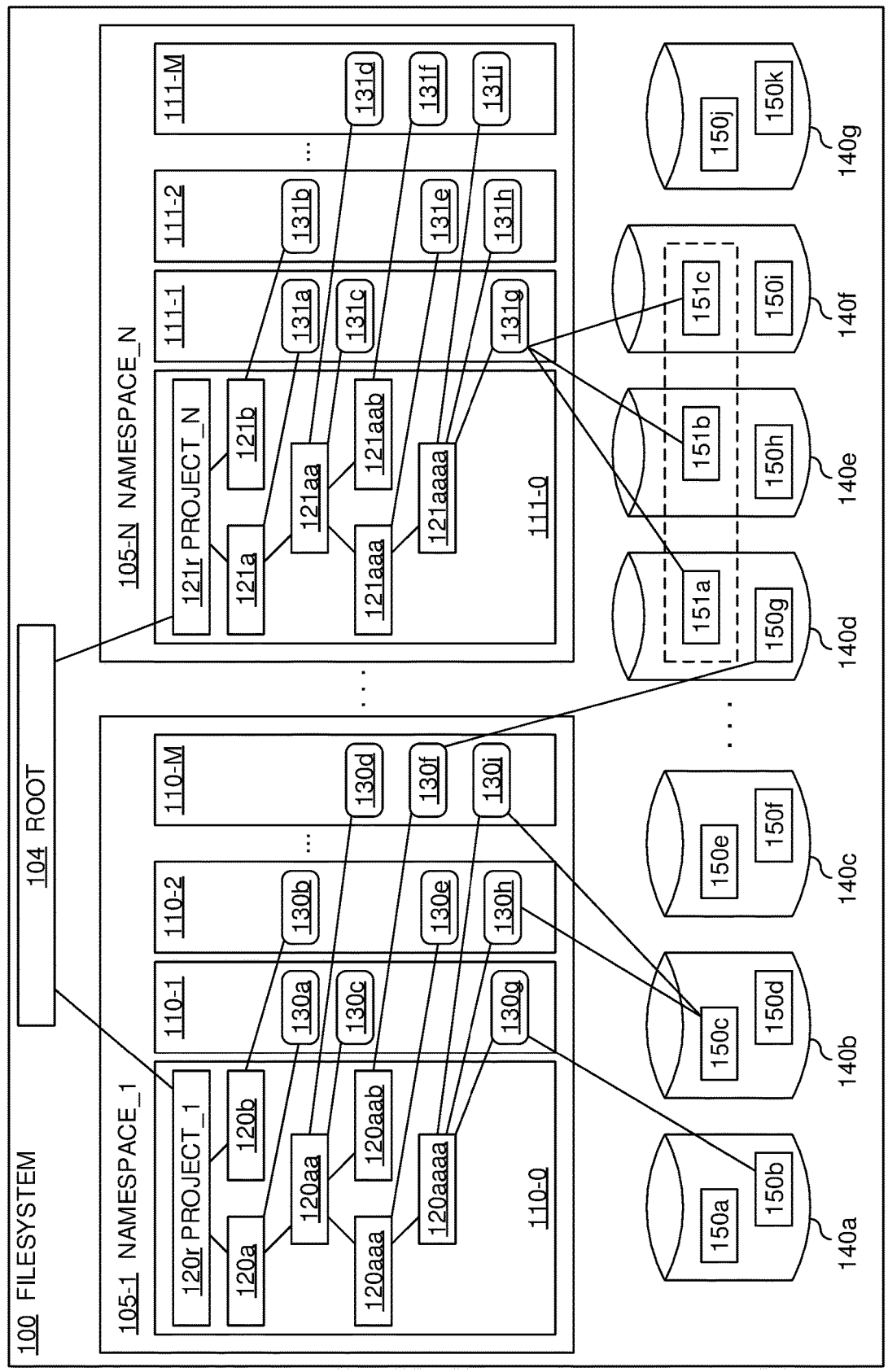
FIG. 1 is a block diagram of an example filesystem, as can be used in certain examples of the disclosed technologies.

This disclosure is set forth in the context of representative embodiments that are not intended to be limiting in any way.

I. Introduction to the Disclosed Technology

Through the innovative technologies described herein, enumeration functions can be implemented scalably, transparently, and efficiently for all sizes of file systems, including extremely large file systems. As used herein, a file system (or filesystem) is any combination of data structures, methods, storage, computing hardware, and/or networking hardware used to manage files and related objects in a computing environment. In examples, a file system can be hierarchical.

In this disclosure, the term "enumeration" refers to any metadata task that requires traversal of at least a subset of all entries of a directory. Thus enumeration encompasses tasks such as (a) listing a directory, for example with an ls command, which outputs zero, one, or more metadata records for the traversed directory; (b) changing file attributes or properties, for example with a chattr command, which operates on traversed entries without returning anything; (c) deleting multiple files, for example with a rm *.txt command, which deletes traversed entries; (d) returning total disk usage, for example with du -hc, or counting objects, both of which operate on traversed entries and return a consolidated result. In certain examples, an enumeration function is distributive: performing an enumeration function on (or enumerating) a target directory or a group of target directories or a group of objects implies enumerating (or performing the enumeration function on) each object within the target directory or group of target directories or group of objects. Augmented enumeration tasks can include determining if an object satisfies a filter condition.

Enumeration tasks can be specific to a single directory, or they can span an entire subtree of a directory, for example with an ls -R command. The term subtree can refer to a proper subtree or an entire tree, which is just the subtree of a root node.

Furthermore, an enumeration task is considered to be an enumeration if the size of a traversed subset is not apparent from the command, even if the actual enumeration activity results in traversal of zero or one element in the directory: for example, listing an empty directory. Whereas a task that is directed to a single file entry, such as ls foo (where foo is a filename), is not considered to be an enumeration. Traversal of metadata entries can be in an order according to a storage location, in an internal order where each metadata entry (in examples, except a final metadata entry) leads to a successive metadata entry such as in a linked list, or in an externally specified order where an auxiliary data structure such as a table or a binary balanced tree specifies an order among some or all of the metadata entries of a metadata server. In varying examples, traversal of metadata entries can be confined to a single directory, or can extend across one or more subtrees, encompassing walking up and/or down a file system tree or a sharded file system tree. As used in this disclosure, a metadata entry is a data structure containing information about a file, directory, or other object in a filesystem, and does not include the data content of the file or other object. A metadata entry is managed by a metadata server.

The enumeration tasks can have a standard POSIX-compliant interface, while the implementation can differ from that of conventional POSIX-like file systems, thus providing scalable performance that is completely transparent to users and clients. One of ordinary skill in the art will recognize, however, that this is not a requirement: in some examples, the disclosed technologies can be implemented with proprietary interfaces, a mix of standard and proprietary interfaces, standard interfaces augmented with additional features, or standard interfaces minus some specific features. As used herein, a POSIX-like file system is one that implements at least a subset of POSIX functionality, in accordance with one or more versions of IEEE Std. 1003.1 (with any suffix), and has a hierarchical organization of files, metadata entries, or other objects in folders or directories. A POSIX-like file system need not be certified as POSIX compliant.

II. Example Directory Reading Method

In certain examples, directory reading can be parallelized as follows:

First, a call to an OpenDirectory( ) function is issued with a pathname to a target directory. Entries of the target directory are sharded across a plurality of M metadata servers and stored in their respective metadata stores. A serial process begins with an OpenDirectory( ) call, which builds an array of temporary structures (or data structures, or helper structures) for access to the target directory, each temporary structure associated with a respective metadata server and containing a corresponding directory location counter initialized to a starting location for that metadata server. The array of temporary structures is accessed by a temporary handle DirectoryHandle. Second, parallel tasks are farmed out to each file metadata server to read each file metadata server's directory entries in parallel. The serial process is suspended until some or all of the parallel tasks have completed. Each parallel task is provided with its respective temporary structure within the array of temporary structures. Each file metadata server processes its respective task to read its own directory entries serially in a loop, via iterated calls to a ReadDirectory( ) function. The ReadDirectory( ) function uses the information in its corresponding temporary structure reads a successive entry, outputs desired information from that entry to an output destination, and increments the corresponding directory location counter. The loop terminates upon reaching a null entry or null pointer, completing the parallel task.

Finally, the serial process resumes upon completion of some or all of the parallel tasks. All the file metadata servers are instructed to perform their respective closing operations, the array of temporary structures is destroyed, and the temporary DirectoryHandle is destroyed.

In certain examples, similar parallelized operations are used to implement other metadata operations, including chattr, chmod, chown, utime, and other similar commands which can traverse a directory or subtree of a file system.

As used herein, a metadata server is one or more processors, with memory and storage attached thereto, and configured to execute software instructions to manage metadata of a file system such as directory entries for files and directories. The metadata server can have additional computing peripherals such as network adapters or other input/output devices. As used in this disclosure, parallel operations are operations conducted independently by different metadata servers of a single filesystem, unless the context indicates otherwise. As used in this disclosure, a target directory is any directory or subtree of a file system to which an enumeration command (including an augmented enumeration command) is directed. The terms secondary metadata server, file metadata server, and sharded metadata server are generally synonymous. The unqualified term "metadata server" often refers to a sharded metadata server, but is occasionally used to refer generically to any metadata server, including both primary and secondary metadata servers, as clear from the context.

III. Example File System

FIG. 1 is a block diagram of an example filesystem, as can be used in certain examples of the disclosed technologies. Filesystem 100 is accessed through its root 104. Through the root 104, a plurality of independent namespaces can be accessed. For the purpose of illustration, an example having a positive integer number N of namespaces is shown, of which two namespaces are NAMESPACE_1 105-1 and NAMESPACE_2 105-2. Within NAMESPACE_1 105-1, a primary file metadata server 110-0 maintains a hierarchical directory subtree of NAMESPACE_1 105-1 having a subtree root node at the top level directory entry PROJECT_1 120r. As described below for this example, primary file metadata server 110-0 does not maintain entries for individual files.

PROJECT_1 120r is considered to have a depth of zero within the NAMESPACE_1 105-1 subtree. Under PROJECT_1 120r, a tree of directories is organized: two directories 120a, 120b are at a depth of one, another directory 120aa is at depth of two, under directory 120a, followed by two directories 120aaa and 120aab at a depth of three, and 120aaaa at a depth of four. A particular directory can have zero or more subdirectories. Additionally, each directory can contain zero or more files or other objects. Each file or other object has a respective directory entry, some of which are shown as 130a-130i. In the illustrated example, the directory 120aaaa contains three files, having respective entries 130g, 130h, 130i, while another directory 120a contains just one file 130a, and subtree root node PROJECT_1 120r directly contains zero files.

One of ordinary skill in the art will recognize that this is merely a simple example for illustration; examples of the technologies disclosed herein can have far greater depth, far greater fanout (breadth), and far greater total numbers of files and of directories than the depicted subtree of NAMESPACE_1 105-1, while other examples can have less depth, less fanout, and/or less total numbers of files and directories than shown. Depths can be as great as 1,000, 1,000,000, 1,000,000,000, or even higher, and can be as small as zero. Fanouts can be as great as 1,000, 1,000,000, 1,000,000,000, or even higher, and can be as small as zero. The total numbers of files and directories can individually be as great as 1,000, 1,000,000, 1,000,000,000, 1,000,000,000, 000 or even higher, and can individually be as small as zero. Further, the distribution and organization of the directories and files can be balanced or unbalanced, to any degree. Additionally, depths, fanouts, and numbers of files and subdirectories associated with any directory can vary dynamically—even, in some examples, deleting a directory and its contents completely.

The directory entries 130a-130i are distributed, or sharded, across a plurality of M file metadata servers 110-1, 110-2, . . . 110-M. Thus, file metadata server 110-1 contains directory entries for three files or other objects 130a, 130c, and 130g. File metadata servers 110-2 and 110-M respectively contain entries for {130b 130e 130h} and {130d 130f 130i} respectively. In certain examples, it is desirable to have reasonably well balanced distributions of file directory entries among file metadata servers. In some examples, the association of a file directory entry with a particular metadata server can be determined based on a hash of the file's name, or by some other key-to-index mapping procedure. Using a hash makes the probability of a significant imbalance in the distribution of file directory entries among file metadata servers very small. Any of a wide variety of hash functions can be used, including FNV hash, HighwayHash, and the SHA family of hashes, to name a few.

FIG. 1 also shows a storage layer of filesystem 100. Storage repositories 140a-140g provide storage for data objects incorporating the data contents of files that are part of filesystem 100. For purpose of illustration, only a subset of links between file directory entries and storage objects is shown. The links shown illustrate a range of mapping options that can be supported in filesystem 100. Thus, the file whose directory entry is 130g has its contents stored in storage object 150b in repository 140a; storage object 150b is dubbed a unitary object, containing data of a single file. Two files having respective directory entries 130h and 130i have their contents stored in a packed data object 150c in object repository 140b. The file having directory entry 131g has its contents spread among multiple objects 151a, 151b, and 151c on respective repositories 140d, 140e, and 140f. Accordingly this file is dubbed a multi-object file. Finally, in the example shown the file whose entry is 130f has its data stored in data object 150g on repository 140d. In this example, the single repository 140d can store data objects from multiple namespaces, and the entries 130f and 130i on a single metadata server can be associated with data objects on distinct repositories.

The number N of namespaces in filesystem 100 can be any number from 1 to 10 to 1,000, to 1,000,000 or even larger than that. Furthermore, the number N of namespaces can be varied dynamically over the lifetime of filesystem 100, with primary metadata servers added, removed, or migrated using either hot or cold provisioning, virtual machine, and/or cloud technologies.

The number M of file metadata servers in one namespace can be any number from 1 to 10 to 1,000, to 1,000,000 or even larger than that. However, in order to realize parallelization benefits of the innovative technologies described herein, in certain examples it is desirable to have M≥2. Furthermore, the number M of file metadata servers can be varied dynamically over the lifetime of a namespace, with metadata servers added, removed, or migrated using either hot or cold provisioning, virtual machine, and/or cloud technologies. Additionally, two namespaces can have the same or different numbers of metadata servers. Any combination of the primary metadata server and file metadata servers of a single namespace can be co-located in a single tray, in a single rack, in a single cabinet, in a single datacenter, or they can be distributed among zero or more each of trays, racks, cabinets, clusters, supercomputers, datacenters, or clouds. The metadata servers of two distinct namespaces can likewise be co-located or distributed among various enclosures and facilities.

The number X of storage repositories can be selected independently of the number N of namespaces and the number M of file metadata servers in each namespace. The number X can be as small as one, or it can be as large as M, N, or M×N, or even larger than that, or any intermediate number. Storage repositories can be homogeneous or heterogeneous, and can incorporate features such as redundancy, replication, snapshotting, caches, error correction coding, and deduplication; in some examples, these features can be transparent to the rest of the filesystem. Storage repositories can have block-level and/or file-level interfaces. Storage repositories can be co-located or distributed among themselves and/or in relation to associated metadata servers.

The components of filesystem 100 can be interconnected by any of a variety of technologies, including direct attachment, buses, optical links, wiring, networks, switched networks, fabrics, and wireless. Employed networking protocols can include SCSI, FibreChannel, TCP/IP, Ethernet, and their variants and combinations.

A file metadata server can also incorporate some indexing or overhead data structures in addition to its store of file directory entries. In certain examples, a minimum level of overhead structure is a traversable structure of all the file directory entries belonging to a particular directory. Thus, when a parallelized task for a particular target directory is launched on a file metadata server by its primary metadata server, the parallelized task can be launched with a pointer to a starting element for the target directory, after which the file metadata server can traverse all entries for the target directory on its own. The traversable structure can be a linear array, a linked list, a tree, or some other data structure providing ease of traversal together with insertion and deletion capabilities. The linear array and linked list can be traversed starting from their first or last elements, while the tree can be traversed starting from its root node, however this is not a requirement, as all of these structures offer efficient traversal starting at any location. In other examples, the level of overhead structure can be varied and can even include a replica of the directory tree of the primary metadata server on each file metadata server. A file metadata server provided with its own directory tree can walk the directory tree independently, which can reduce overhead significantly for recursive operations, as compared to launching, say, a million tasks on each file metadata server while traversing a directory tree having a million directories.

IV. Example Enumeration Procedure

Figure 2:
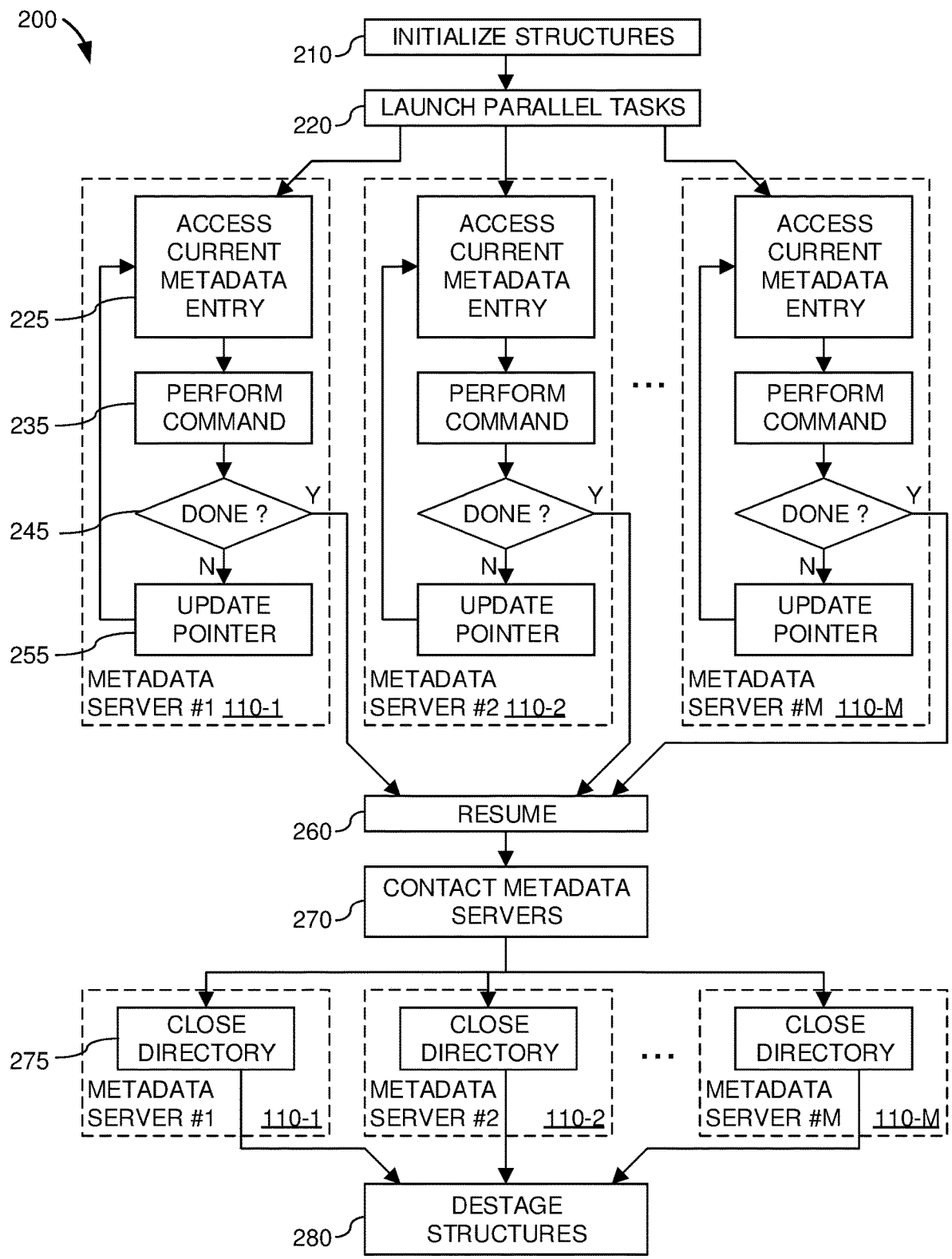
FIG. 2 is a flowchart outlining an example method for listing objects in a file system, as can be used in certain examples of the disclosed technologies.

FIG. 2 is a flowchart 200 outlining an example method for enumerating objects in a target directory of a file system or namespace. Flowchart 200 can be executed in response to a corresponding command received by a computer or primary metadata server 110-0. As used in this disclosure, a command is a machine-to-machine communication, for example an enumeration command or augmented enumeration command transmitted from a client computing node to a file system or its primary metadata server over a network. A command can be an internal command transmitted from a primary metadata server to a secondary metadata server over an internal network.

At process block 210, an OpenDirectory( ) call is implemented to open the target directory and initialize structures required to enumerate, list, or traverse entries in the associated file metadata servers. In certain examples, the OpenDirectory( ) call initializes an array of structures, one for each metadata server in the target namespace. Each structure is a data structure, or helper structure, which can contain a pointer, counter, or other index associated with entries of the target directory on the corresponding metadata server. In certain examples, this pointer or index is initialized to point to a starting entry among entries of the target directory on the corresponding file metadata server. At process block 220, parallel tasks are launched on each file metadata server 110-1 . . . 110-M.

Operation of the parallel task on file metadata server 110-1 is described with reference to process blocks 225-255. The tasks on the other file metadata servers 110-2 . . . 110-M operate similarly. In some examples, the parallel task on file metadata server 110-1 commences in response to a command from primary metadata server 110-0 to file metadata server 110-1. In some examples, the file metadata server 110-1 can open its portion of the target directory (not shown) upon launch of its parallel task, prior to accessing file metadata entries.

At process block 225, file metadata server 110-1 uses its initialized pointer or index to access a metadata entry of the target directory. At process block 235, the file metadata server 110-1 performs the appropriate command for the present enumeration activity. In certain examples including POSIX examples, a range of enumeration commands operate similarly, returning metadata entities (such as a dirent) for each traversed metadata entry. In some non-POSIX examples, commands can include augmentation features such as filtering or sorting, which are included in the description below.

In some examples of an augmented listing task, file metadata server 110-1 can apply a filter, if provided in the enumeration command, and can output a record for the current metadata entry, if the current entry is not rejected by a filter. The output can be sent to a destination such as stdout, a file, a stream, the primary metadata server 110-0, an output processor, a host computer, a network connection, or to another destination. In certain examples a processor at the output destination can provide post-processing functions such as sorting. In certain non-POSIX examples, post-processing (e.g. sorting) can be performed locally at file metadata server 110-1, leaving the output destination with a simpler merge (or, merge sort) to perform. In such examples, output can be delivered after traversal and post-processing are complete, while in other examples, output is provided one-by-one as each object is enumerated. In still other examples, output is provided in batches for efficient use of I/O or network bandwidth. In certain examples, the output destination can be provided in the corresponding structure for file metadata server 110-1 in the array of structures. In certain examples, the output destination can be provided along with or embedded in the command sent from primary metadata server 110-0 to file metadata server 110-1 while launching the parallel task at process block 220. A path, communication port, network link, or buffer over which enumeration output is provided to an output destination is dubbed an output channel.

For an example of a chattr task, file metadata server 110-1 can change file attributes for the current entry, as directed by the enumeration command. For an example of a delete task, file metadata server 110-1 can optionally apply a filter, if provided in an augmented enumeration command, and can optionally return a record for the current metadata entry, if the current entry is not rejected by a filter. For an example of a disk usage task, file metadata server 110-1 can optionally apply a filter, if provided in an augmented enumeration command, and can optionally add the disk usage of the current metadata entry to a running total, if the current entry is not rejected by a filter. In certain examples, the running total can be maintained within the corresponding structure for file metadata server 110-1 in the array of structures. In certain examples, the running total can be maintained locally by file metadata server 110-1 until the directory traversal is complete.

In some examples of augmented enumeration, commands having filter arguments can be implemented by traversing the entire directory or subtree and operating on only those entries matching the filter. In other examples, filters can align with inherent features of the directory organization, allowing efficient traversal of just a subset of directory entries. As an illustrative example, a filesystem can maintain directory entries in alphanumeric sorted order, so that a command to ls c* can be implemented efficiently by starting at the first c entry and traversing the directory until the end of the c entries has been reached. Thus, an enumeration task can not necessarily require traversing every entry of a directory. Entries not satisfying a filter condition can be omitted or skipped. Filters can be based on an object attribute, an object name, an object property, an object type, or a field comprising a wildcard or a range.

At process block 245, file metadata server 110-1 determines from the current metadata entry whether the traversal is complete (Y branch) or whether any more metadata entries for the target directory are present (N branch). If there are more metadata entries, the pointer or index is updated at process block 255 and control returns to process block 225 to continue the traversal with the next metadata entry. If there are no more metadata entries, the primary metadata server 110-0 is signaled to indicate that file metadata server 110-1 has completed its traversal. In certain examples, each metadata entry contains a direct or indirect pointer to a next metadata entry for the target directory, and a NULL pointer can be used to signify that the traversal is complete.

In certain examples, accessing successive metadata entries can be aided by an indexing structure maintained locally by file metadata server 110-1. In such examples, the indexing structure can provide a location of a metadata entry, and this location can be used to access the corresponding metadata entry. Then, the indexing structure is traversed to locate the next metadata entry, which is accessed similarly. The traversal of the indexing structure can be implemented by following adjacent, successive, or linked entries in the indexing structure. This sequence is repeated until there is no next metadata entry, which can be signaled by a NULL location or an END record. In other examples, the functions of the indexing structure are embedded within the metadata entries themselves, or the organization of the metadata entries themselves. In some examples, the indexing structure can be used to locate a first metadata entry at which to begin traversing the target directory. In some examples, the indexing structure can support traversing subdirectories of the target directory, for efficient recursive enumeration.

One of ordinary skill in the art will recognize that there are numerous alternative processes for determining completion of the traversal. In certain examples, process blocks 245 and 255 can be interchanged. In certain examples, metadata entries for a target directory can be maintained in contiguous locations, and a determination whether the traversal is complete can be made in between process blocks 225 and 235, when an accessed entry is found to be marked END. In certain examples, the test for completion can be performed prior to block 225, including for the first metadata entry.

One of ordinary skill in the art will recognize that there are numerous alternative procedures for performing the traversal on file metadata server 110-1. For example, the traversal can be multi-threaded on file metadata server 110-1. These and all similar alternatives are expressly included within the scope of the innovative technologies described herein.

In the procedure described above, an enumeration function is performed on each metadata entry as the directory is traversed. Thus, enumeration and traversal operate concurrently, in lockstep. Furthermore, the parallel tasks on each file metadata server 110-1 . . . 110-M also operate concurrently, although there can be small time offsets between commencement of the various parallel tasks, particularly in examples where the parallel tasks are launched by individual commands or messages to the several file metadata servers 110-1 . . . 110-M. In such examples, a parallel task on file metadata server 110-1 could commence before the parallel task on file metadata server 110-M has been launched, or before process block 220 has completed. As used in this disclosure, operations are termed "concurrent" if they are performed simultaneously by different metadata servers or different processors; or if they are extended operations that are performed in interleaved fashion by a single metadata server or processor. The interleaved operations need not be performed in regular or synchronous fashion.

At process block 260, with all parallel tasks complete, the serial process on primary metadata server 110-0 is resumed. At process block 270, the primary metadata server 110-0 instructs all file metadata servers 110-1 . . . 110-M to close the target directory. At process block 275, file metadata server 110-1 closes its portion of the target directory, and the other file metadata servers 110-2 . . . 110-M respond similarly. At process block 280, the array of data structures is destaged because the enumeration task is complete and the array of structures is no longer required. In this disclosure, destaging is used to refer to operation(s) that make a data object unavailable, inactive, or not directly available. In certain examples, destaging involves freeing the associated memory. In certain examples, the array of structures is preserved for future enumeration tasks. In certain examples, a handle to the array of structures is destroyed.

In some examples, one or more file metadata servers can have zero entries associated with the target directory. For example, in FIG. 1, file metadata server 110-2 has no entries for directory 120*aa*. This case can be handled differently in different embodiments of the innovative technologies described herein. In certain examples, the primary metadata server 110-0 makes a determination for each file metadata server 110-1 . . . 110-M as to whether the file metadata server contains any metadata entries for the target directory, and only launches a parallel task for those file metadata servers that do have at least one metadata entry for the target directory. In certain examples, parallel tasks are launched on all file metadata servers, and any file metadata server having no entries for the target directory completes its task without accessing any metadata entries, or by accessing a first entry which is determined to be an END record.

V. Example Enumeration Procedure

Figure 3:
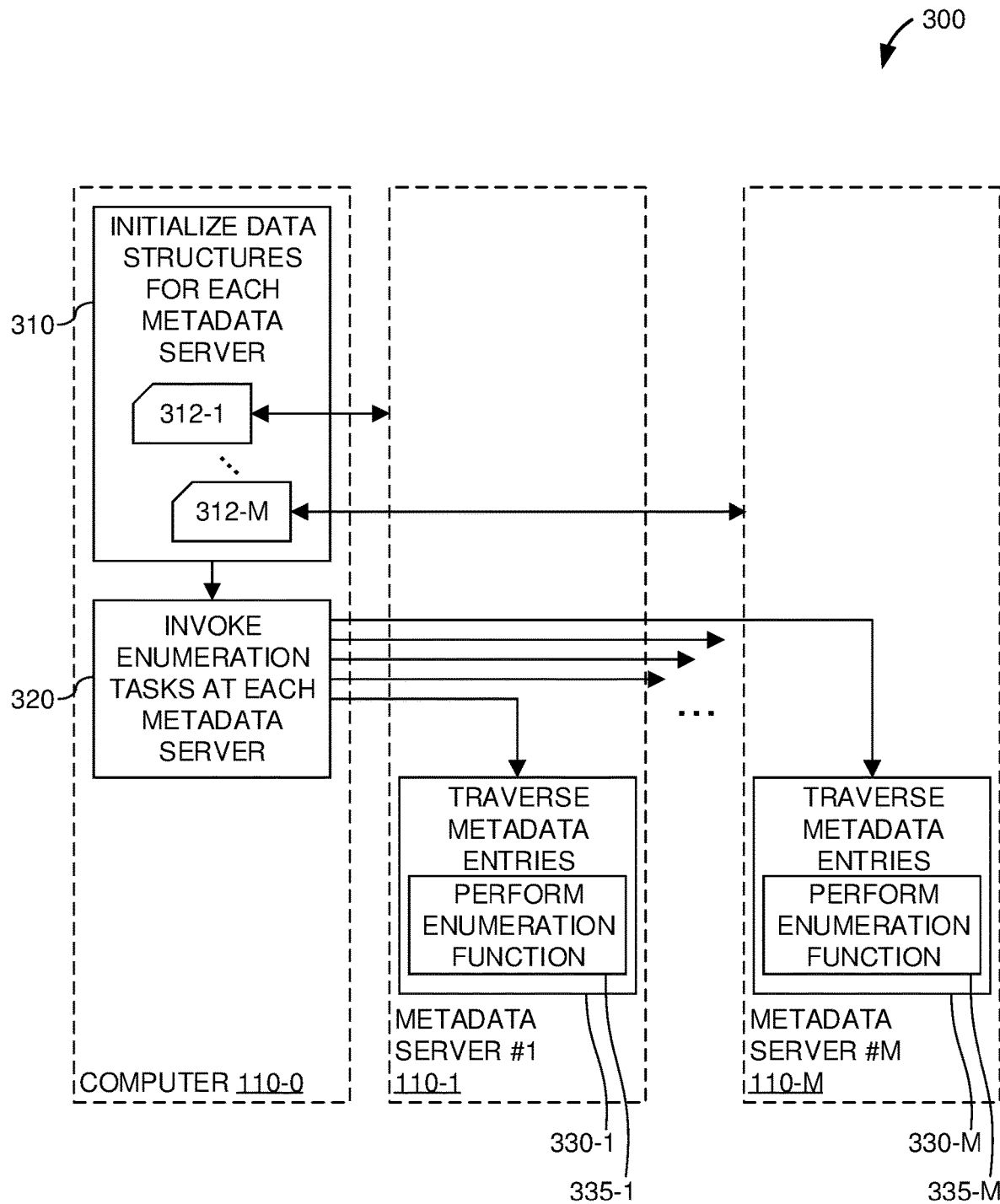
FIG. 3 is a flowchart outlining an example method for enumerating objects in a target directory of a file system or namespace, according to disclosed technologies.

FIG. 3 is a flowchart 300 outlining an example method for enumerating objects in a target directory of a file system or namespace. At process block 310, a computer 110-0, which can be a primary metadata server, initializes data structures 312-1 . . . 312-M for respective metadata servers 110-1 . . . 110-M, two of which are shown in the figure. In examples, the data structures 312-1 . . . 312-M can be a table, an array, a list, an atomic variable, or another structure that contains one or more pointers, counters, or other indices associated with entries of the target directory on the corresponding metadata server. Data structures 312-1 . . . 312-M can contain, for example, an inode value indicating the root or starting position of an enumeration. Alternatively or additionally, data structures 312-1 . . . 312-M can contain a representation of an enumeration function or other parameters controlling a desired enumeration to be performed on the associated metadata servers 110-1 . . . 110-M. At process block 320, computer 110-0 invokes enumeration tasks at each of the metadata servers As discussed above, the number M of metadata servers can vary widely between examples, and can also vary dynamically over the lifetime of a particular example. In particular, M can be as low as zero or one when a file system is being newly provisioned, or is no longer being actively used.

The invocation of parallel tasks at process block 320 can be by separate commands to each metadata server 110-1 . . . 110-M, by a single common command sent to all metadata servers 110-1 . . . 110-M, or by another form of software or hardware signal generated by computer 110-0.

The enumeration task on metadata server 110-1 proceeds to traverse metadata entries of metadata server 110-1 at process block 330-1 using its associated data structure. As the metadata entries are traversed, an enumeration function is performed with each of the traversed metadata entries, as indicated by process block 335-1, to enumerate the target objects for which metadata server 110-1 maintains the associated metadata entries. Process blocks 330-M and 335-M operate similarly at metadata server 110-M does likewise. Although not shown, other metadata servers also perform respective enumeration tasks to enumerate their respective target objects.

In various embodiments, data structures 312-1 . . . 312-M can be passed to respective metadata servers along with invocation of the enumeration tasks, or the metadata servers can access their respective data structures by callback, message passing, or through shared memory. In examples, a metadata server can increment an index of the data structure in a local copy of the data structure, which need not be updated and maintained in the original data structure on the computer or primary metadata server.

Further details of these and associated operations are described elsewhere in this disclosure.

VI. Example Enumeration Procedure

Figure 4:
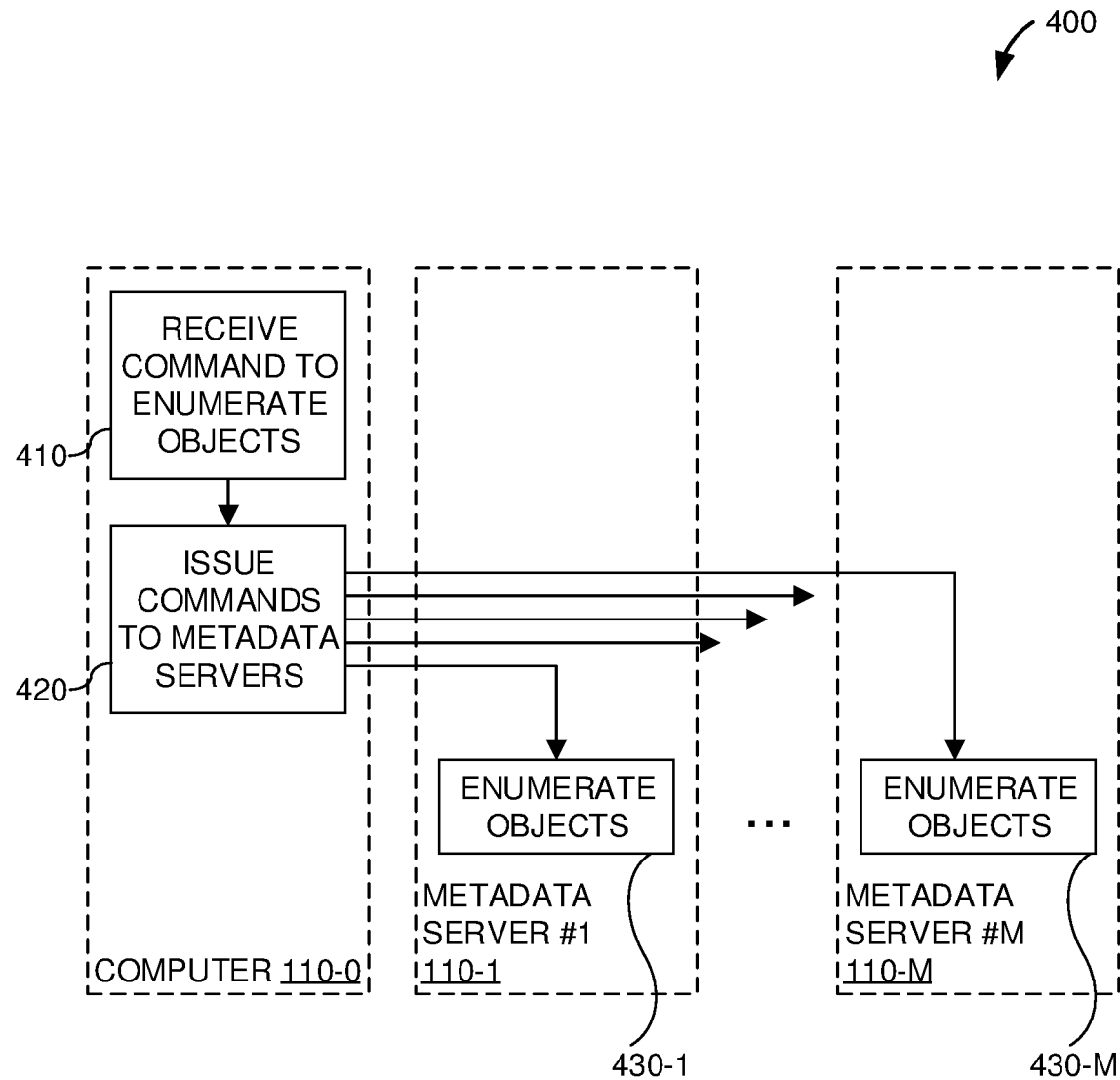
FIG. 4 is a flowchart outlining an example method for enumerating objects in a target directory of a file system or namespace, according to disclosed technologies.

FIG. 4 is a flowchart 400 outlining an example method for enumerating objects in a target directory of a file system or namespace. At process block 410, a computer 110-0, which can be a primary metadata server, receives a command to enumerate objects. At process block 420, computer 110-0 issues corresponding commands to each of multiple associated metadata servers 110-1 . . . 110-M, two of which are shown in the figure. As discussed above, the number M of metadata servers can vary widely between examples, and can also vary dynamically over the lifetime of a particular example. In particular, M can be as low as zero or one when a file system is being newly provisioned, or is no longer being actively used.

The commands sent at process block 420 can be separate commands to each metadata servers 110-1 . . . 110-M, or can be a single common command sent to all metadata servers 110-1 . . . 110-M. Furthermore, for reasons of spatial distribution, logical distribution, or heterogeneity of the metadata servers 110-1 . . . 110-M, these commands can be sent in groups: for example, two but not all of the metadata servers 110-1 . . . 110-M can receive a same command, or identical commands. Furthermore, the commands sent at process block 420 can be identical to, distinct from, or related to the command received at process block 410. For example, a command sent at process block 420 can be derived from the command received at process block 410 by adding, removing, and/or modifying one or more elements.

Upon receipt of the command from computer 110-0, metadata server 110-1 proceeds at process block 430-1 to enumerate those objects for which it maintains the associated metadata entries. At process block 430-M, metadata server 110-M does likewise. Although not shown, other metadata servers also enumerate their respective objects upon receipt of their respective commands.

Further details of these and associated operations are described elsewhere in this disclosure.

VII. Example Enumeration Procedure

Figure 5:
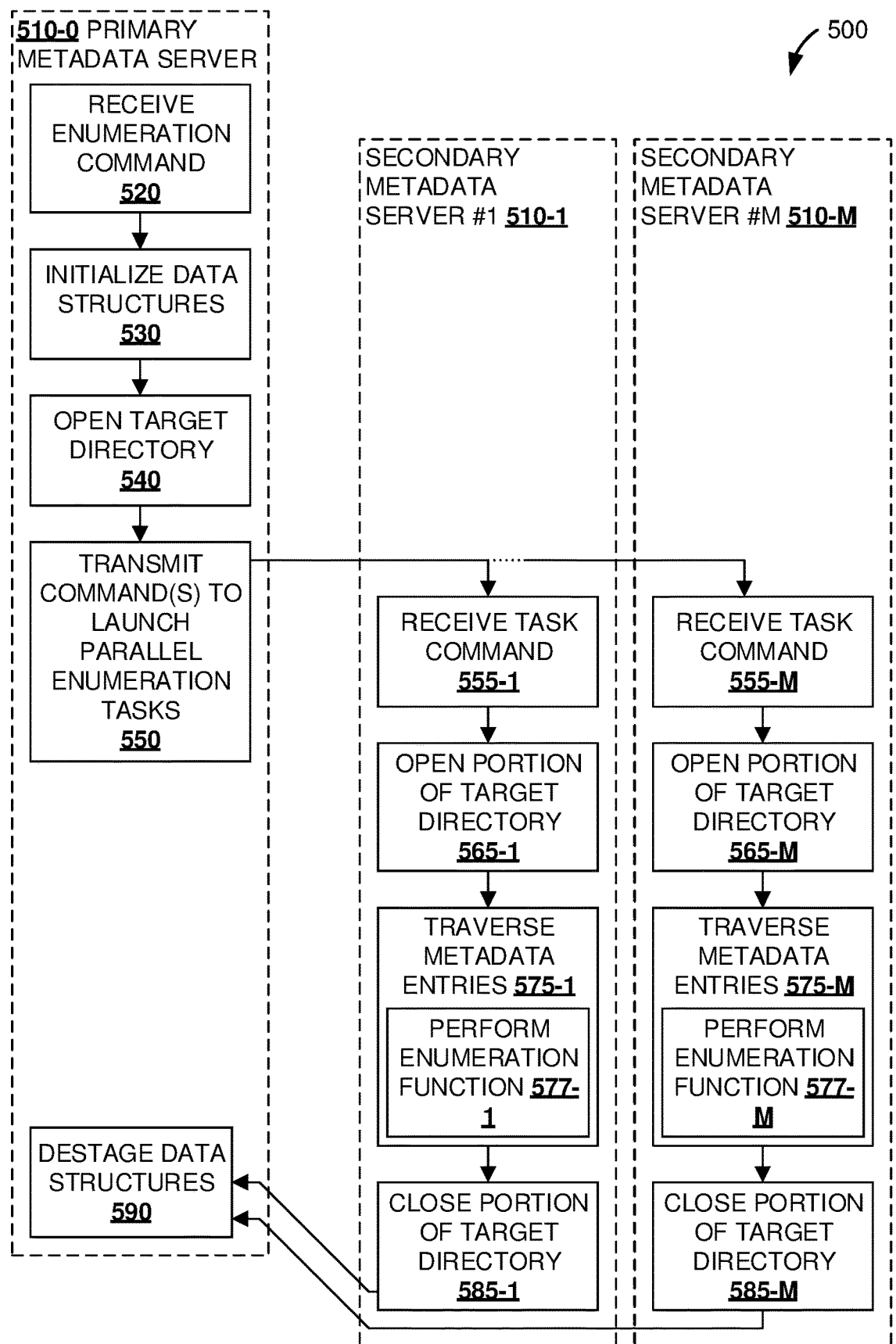
FIG. 5 is a flowchart outlining an example method for enumerating objects in a target directory of a file system or namespace, according to disclosed technologies.

FIG. 5 is a flowchart 500 outlining an example method for enumerating objects in a target directory of a file system or namespace. At process block 520, a primary metadata server 510-0 receives a command to enumerate objects. At process block 530, primary metadata server 510-0 initializes data structures associated with respective secondary metadata servers 510-1 . . . 510-M, two of which are shown in the figure. In this example, initialization of a data structure includes initialization of a respective index of the data structure. The respective index can be an inode value, reference, or pointer indicating a root inode or start position for enumeration on the associated secondary metadata server. As used herein, an inode is a data structure that stores information about a file, directory, symbolic link, or other entity in a file system. In examples, an inode stores all information about the file (or other object) except its name and data content. An inode value is an identifier of an inode. A metadata entry can include an inode.

At process block 540, the primary metadata server 510-0 opens a target directory containing the objects to be enumerated. In some examples, process block 540 can be performed prior to process block 530, or can be performed after the data structures are allocated but before the respective index values are initialized. At process block 550, one or more commands are transmitted from the primary metadata server 510-0 to the secondary metadata servers 510-1 . . . 510-M to launch parallel enumeration tasks at each of the secondary metadata servers 510-1 . . . 510-M. Following completion of the parallel enumeration tasks, the data structures can be destaged at process block 590. The data structures can be destaged individually as each secondary metadata server 510-1 . . . 510-M completes its enumeration task and notifies the primary metadata server 510-0, or all data structures can be destaged together, after all secondary metadata servers 510-1 . . . 510-M have completed their enumeration tasks.

Each secondary metadata server performs its enumeration task in the following manner, described in context of secondary metadata server 510-1. Other secondary metadata servers 510-2 . . . 510-M (of which 510-M is shown) operate similarly. At process block 555-1, the secondary metadata server 510-1 receives the command to launch its enumeration task. At process block 565-1, the portion of the target directory managed by secondary metadata server 510-1 is opened, following which metadata entries are traversed using the corresponding data structure, for example by obtaining the index initialized at process block 530, and using this index to initiate the traversal of metadata entries. Each metadata entry represents a corresponding target object of the file system. During traversal, the index obtained from the respective data structure can be updated locally at the secondary metadata server 510-1. As indicated by process block 577-1, an enumeration function is performed with each of the traversed metadata entries. After the traversal 575-1 and enumerations 577-1 have been completed, the secondary metadata server 510-1 can close its portion of the target directory at process block 585-1.

Further details of these and associated operations are described elsewhere in this disclosure.

VIII. Example Building Procedure

Figure 6:
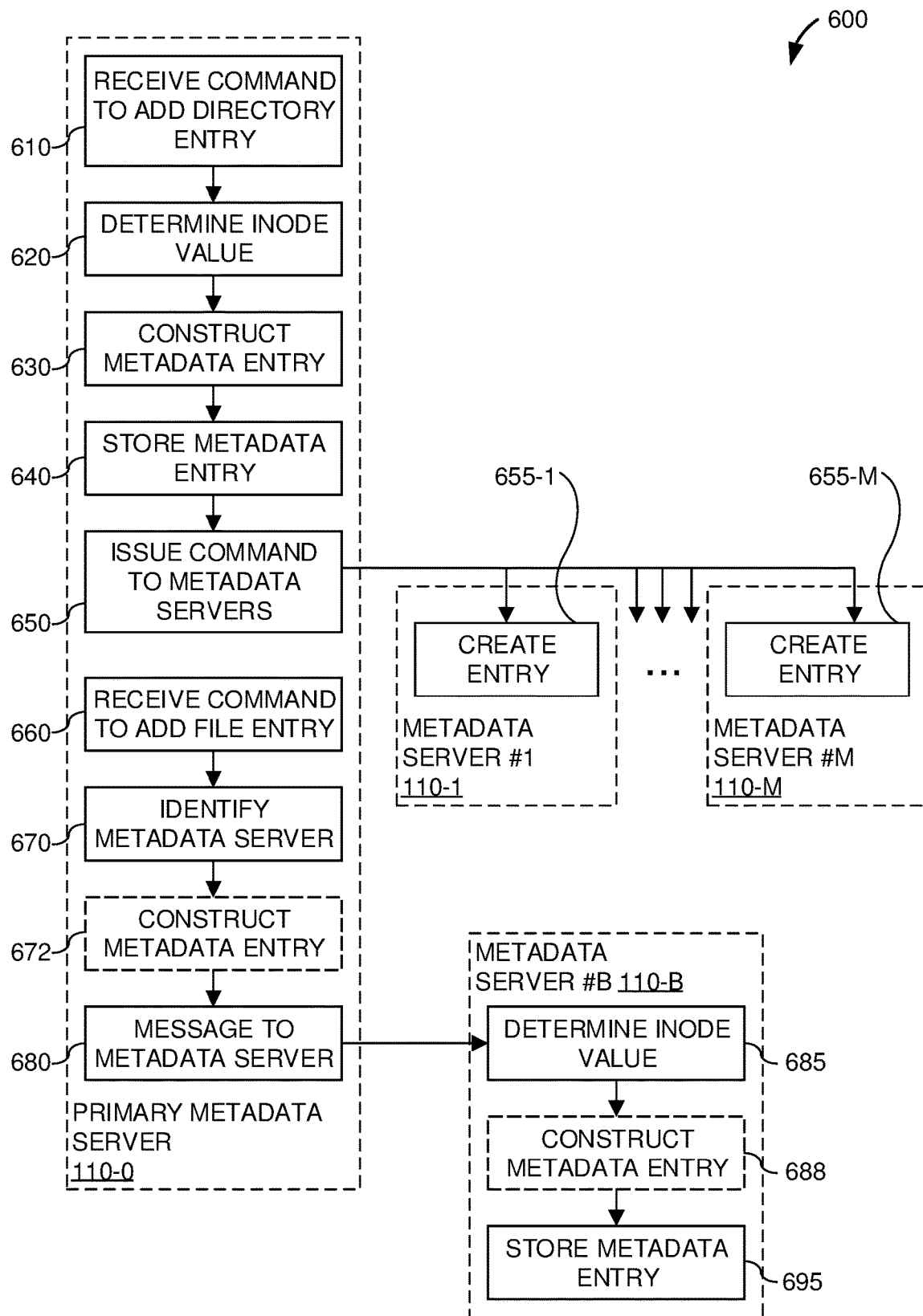
FIG. 6 is a flowchart outlining an example method for constructing or updating a file system or directory structure suitable for implementing scalable enumeration procedures according to disclosed technologies.

FIG. 6 is a flowchart 600 outlining an example method for constructing or updating a file system or directory structure suitable for the enumeration procedures described above. In certain examples, the file system comprises a tree, such as NAMESPACE-1 105-1 described above. The file system can comprise multiple trees in parallel, however the present discussion focuses on constructing a single tree. Generally, the file system tree comprises a hierarchy of directory nodes, each of which has a parent node. As shown in the example of FIG. 1, root node PROJECT_1 120r of NAMESPACE-1 105-1 has a parent node ROOT 104 which is the root node of the entire file system environment. In other examples, the file system can comprise a single namespace and the root node of a tree can have no parent node. As discussed above, the number, organization, depth, and fanout of directory nodes can vary greatly between examples, and also during the lifetime of a single example. Generally, the file system tree also has zero or more files, which are leaf nodes of the file system tree. Each file belongs to and has a parent directory. For the purposes of the file system, each file can be considered as a single unit, although the underlying structure of a file can in some examples be considerably more complex, for example where a logical file unit is a zip file, an archive, a database, or other structured entity. As discussed above, the number, organization, sizes, and distribution of files can vary greatly between examples, and also during the lifetime of a single example. Additionally, the file system can incorporate entities other than directories and files, for example links, entries for deleted records, and entries to support advanced file system functions such as snapshotting and journaling. In some examples, the file system contains files, while in other examples directory structures and metadata entries described herein can be used to manage and scalably enumerate objects other than files, for example network nodes, and in further examples a file system can manage heterogeneous collections of objects of varying types. Nevertheless, non-file objects can in certain examples be considered and treated as files. Furthermore, it is understood that the terms "object(s)" and "file(s)" as used in this disclosure extend to non-file objects.

Thus, for the purpose of this example, constructing a file system can be taken to comprise operations of adding a directory and adding a file. Generally, many such operations will occur over the lifespan of a file system, interspersed with a myriad of other operations, such as deleting, moving, accessing, renaming, archiving, growing, and changing properties of directory and file objects already present in the file system.

At process block 610, a computer such as a primary metadata server 110-0 receives a command to add a new directory entry. Generally, this command can specify one or more of a name, type, properties, or path for the new directory. The path indicates a position in the existing directory structure at which the new directory should be logically located (this position is dubbed a "target location"), although, if unspecified, the path can default to a current location within the directory tree. Similarly, other command parameters can be implemented with default values, which can be global to the namespace or the file system, or can be specific to a subtree within which the new directory is to be placed.

In certain examples, directory entries are maintained on a basis of persistent inode values. The use of inode values imparts certain benefits, for example, the ability to rename or move an object without having to move the metadata entry for that object. However, the use of inode values is not essential for implementation of disclosed technologies. Thus, process block 620 is optional; at this process block an inode value for the new entry is determined. In various examples, inode values can be randomly or pseudo-randomly generated or allocated, or they can be deterministically provided, for example in sequence, or by some combination of random and deterministic methods.

At process block 630, a new metadata entry for the new directory is constructed. The metadata entry can comprise one or more fields as described elsewhere in this disclosure. At process block 640, the metadata entry is stored by primary metadata server 110-0, for example within a metadata store controlled directly by primary metadata server 110-0. At process block 650, the primary metadata server 110-0 broadcasts a command to all associated file metadata servers 110-1 . . . 110-M. In certain examples, this command instructs file metadata servers 110-1 . . . 110-M to create a corresponding entry in a respective directory structure maintained by each file metadata server 110-1 . . . 110-M.

At process block 655-1 . . . 655-M, each file metadata server 110-1 . . . 110-M creates a corresponding entry in its respective directory structure. In certain examples, the respective directory structure on a file metadata server 110-1 . . . 110-M can be organized differently than a directory structure maintained on the primary metadata server 110-0, and can be organized as a flat structure, in contrast to a hierarchical directory structure maintained by the primary metadata server 110-0. In other examples, one or more of associated file metadata servers 110-1 . . . 110-M can maintain a directory structure which can be identical to the directory structure of primary metadata server 110-0.

In some examples, there can also be an action of checking that the addition operation is permissible. Reasons why an addition operation can be disallowed include: permissions of a client, permissions of the parent directory, lack of space, a duplicated entry, or invalid arguments.

The discussion now turns to adding a new file entry.

At process block 660, a computer such as a primary metadata server 110-0 receives a command to add a new file entry. Similar to the command for adding a new directory entry, this command can specify one or more of a name, type, properties, or path for the new file, with optional associated defaults. In examples, the command to add a new file entry also includes a target location for the new file entry, which can be any directory or subtree of the file system; the target location can default to a current location within the file system.

At process block 670, one of the associated file metadata servers 110-1 . . . 110-M is identified to hold the new file entry. This identification can be made based on hashing a file name, or by some other method that is random, pseudo-random, deterministic, or some combination thereof. In certain examples it is desirable for file entries to be equitably distributed among the file metadata servers 110-1 . . . 110-M. Viewed collectively over multiple file entries, the process of distributing file entries across file metadata servers 110-1 . .

. 110-M can be described as sharding. Thus, file entries are sharded across the file metadata servers 110-1 ... 110-M. In the example shown, the new file entry is assigned to file metadata server 110-B.

Process blocks 672 and 688 show alternatives for constructing the file metadata entry for the new file. In certain examples, primary metadata server 110-0 constructs the new file metadata entry at optional process block 672. With or without operation of process block 672, at process block 680, a message is sent from primary metadata server 110-0 to assigned file metadata server 110-B. In certain examples, if the new file metadata entry has been constructed by primary metadata server 110-0, then the message can provide the assigned file metadata server 110-B with access to the new file metadata entry, either by including or attaching the new metadata entry with the message, or by providing a pointer to the new metadata entry. In other embodiments where process block 672 is absent, the message need only provide the information known about the new file, which can include one or more of: a name of the file, parameters or arguments received in the command at process block 660, and default parameters or arguments.

At process block 685, an inode value for the new file entry is determined by assigned file metadata server 110-B. At optional process block 688, the new metadata entry is constructed by file metadata server 110-B, if it has not already been constructed and passed to file metadata server 110-B at process blocks 672 and 680. In some examples, both process blocks 672 and 688 can be present, cooperating by each building part of the new metadata entry. Finally, at process block 695, the new file metadata entry is stored in a metadata store directly controlled by file metadata server 110-B.

Similarly to the new directory entry, the addition of a new file to the file system can comprise additional actions, including checking that the addition operation is permissible, and updating or adding entries to one or more maintained data structures.

IX. Augmented Enumeration

The disclosed technology can be extended to increase scalability of metadata operations beyond basic enumeration functions. For example, an enumeration function can be implemented with a filtering argument that selects a subset of entries within a subtree of the file system. For example, an enumeration function can be implemented with a sort argument so that results are returned to a requesting client in a particular order. Collectively, features such as filtering and sorting that extend a basic enumeration function are dubbed "augmentation features" herein. Implementing filtering, sorting, or another augmentation feature is variably dubbed as executing or performing the augmentation feature or augmentation function, and other similar terms. Augmentation features can be combined, so that a single augmented enumeration request can implement both filtering and sorting, or multiple filters, or multiple levels of sorting, or any other combination of augmentation features. As used in this disclosure, a basic enumeration function is one having no controls on the traversal or outputs of the enumeration function; particularly, a basic enumeration function has no filters or sorting flags. For example, in a POSIX environment, filtering and sorting are provided on the client side, e.g. as part of the ls program. Enumeration through the POSIX application programming interface (API) is basic enumeration, performed using calls such as opendir( ), readdir( ), and closedir( ), with no provision for subsetting, filtering, or sorting. Thus parallelization of augmentation features can provide significant performance improvements, for example when large numbers of file system entries are traversed.

The augmentation features can be performed partly or wholly before traversal of a file system subtree, concurrently with the subtree traversal, or after subtree traversal. For example, filtering can be performed by traversing all subtree metadata entries (within the shard managed by a given metadata server), but performing the enumeration function only for those metadata entries within the scope of the filter, and not performing the enumeration function for those metadata entries that do not satisfy the filter. In such an example, the augmentation feature is performed concurrently with traversal of metadata entries.

In another example, the metadata server can maintain an auxiliary index structure to keep track of target objects according to file extension, last modification date, last access date, creation date, size, or any other attribute. For example, a balanced binary tree of target objects keyed by creation date can speed up an augmented enumeration according to file creation date by determining start and stop index positions in log(N) time (here, N is a number of objects whose metadata entries are managed by the metadata server) and avoiding having to traverse and check, in O(N) time, many metadata entries which fail to satisfy a given filter on date range. Thus, in this example, at least part of the augmentation feature is performed prior to file system traversal. Similar auxiliary structures can be implemented using balanced trees, hash tables, or other data structures to similarly speed up other augmented enumerations. Auxiliary structures can also be used to maintain statistics that in some situations allow response to an enumeration command without any traversal.

In a further example, sorting can be performed within a sharded metadata server after the basic enumeration is complete. By performing sorting individually on each of M metadata servers, a performance gain of about M is obtained as compared to sorting the combined results from all metadata servers; the results of the individual sorted outputs can be subsequently consolidated with a simple merge sort in O(N) time. In this example, the augmentation feature is performed after subtree traversal.

In an additional example, sorting can be performed concurrently with traversal by storing results in a holding data structure which maintains data in a sorted order, such as a balanced binary tree. In further examples, custom augmentation features can be defined and distributed to metadata servers along with an enumeration command. In view of these examples, one of ordinary skill will recognize that augmentation features can be integrated in numerous ways with the basic enumeration function to provide significant performance advantages in large file systems.

X. Example Augmented Enumeration Procedure

Figure 7:
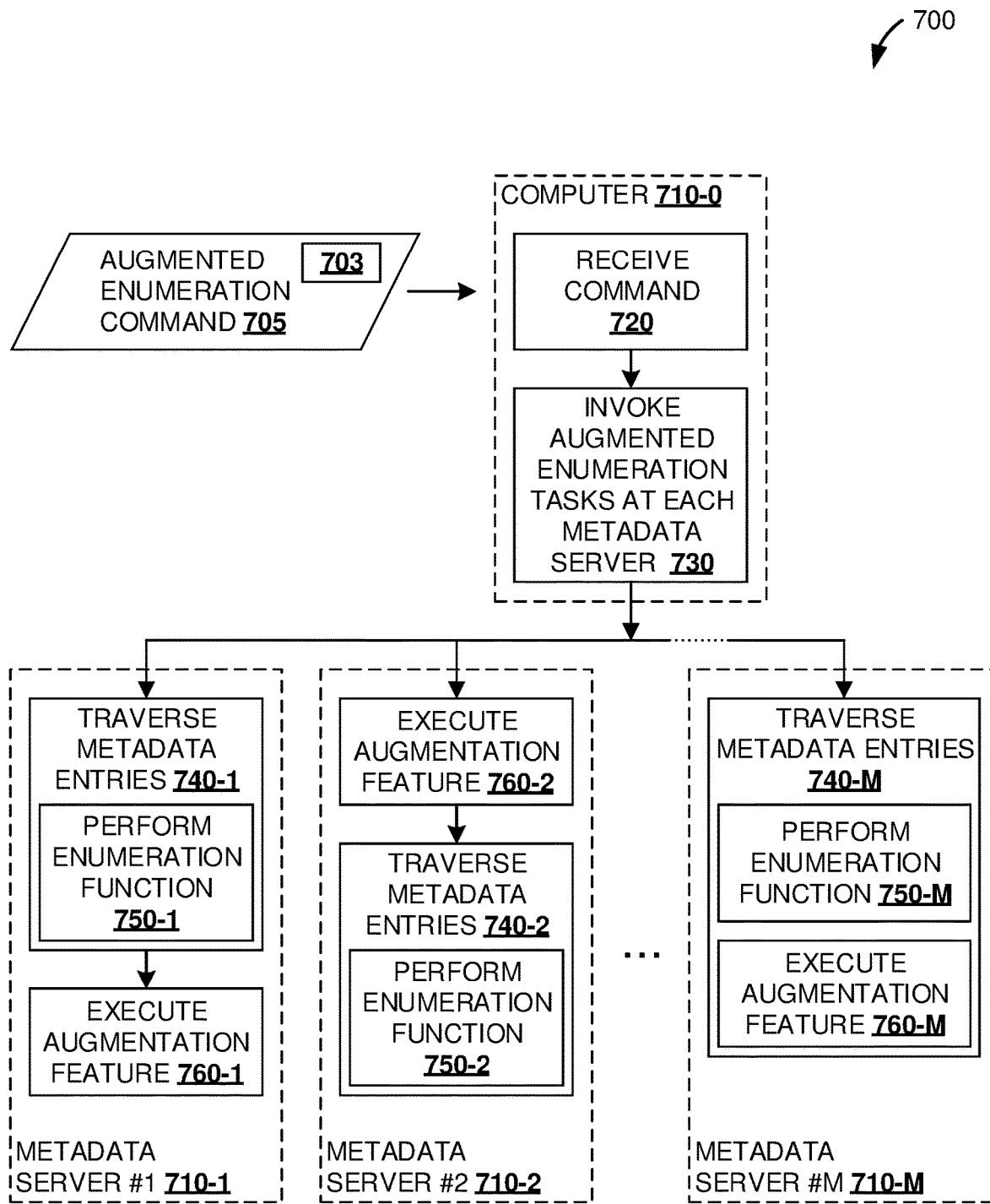
FIG. 7 is a flowchart outlining an example method for augmented enumeration of target objects in a target directory of a file system or namespace, according to disclosed technologies.

FIG. 7 is a flowchart 700 outlining an example method for augmented enumeration of target objects in a target directory of a file system or namespace. At process block 720, a computer 710-0, which can be a primary metadata server, receives a command 705 to perform an augmented enumeration function. Command 705 indicates an augmentation feature to be applied in conjunction with a basic enumeration function. For example, the command 705 can incorporate a filter specification or a sort flag or other indication as shown by item 703. At process block 730, computer 710-0 invokes augmented enumeration tasks at each of a plurality metadata servers 710-1 . . . 710-M.

Metadata server 710-1 traverses its metadata entries at process block 740-1, wherein each metadata entry represents a corresponding target object in the file system. The basic enumeration function is performed for at least one of the traversed metadata entries at process block 750-1. The augmentation feature is executed at process block 760-1. The illustration for metadata server 710-1 shows the augmentation feature being executed after traversal 740-1 is complete. The illustrations for metadata servers 710-2 and 710-M show similar actions as for metadata server 710-1, however with different ordering of the actions. The illustration for metadata server 710-2 shows the augmentation feature being executed prior to traversal, while the illustration for metadata server 710-M shows the augmentation feature being executed concurrently with traversal and enumeration of a sharded subtree of the file system. As described herein, other sequences are also possible, such as execution of the augmentation feature partially before, partially during, and/or partially after the traversal of metadata entries.

Further details of these and associated operations are described elsewhere in this disclosure.

XI. Example Augmented Enumeration Procedure

Figure 8:
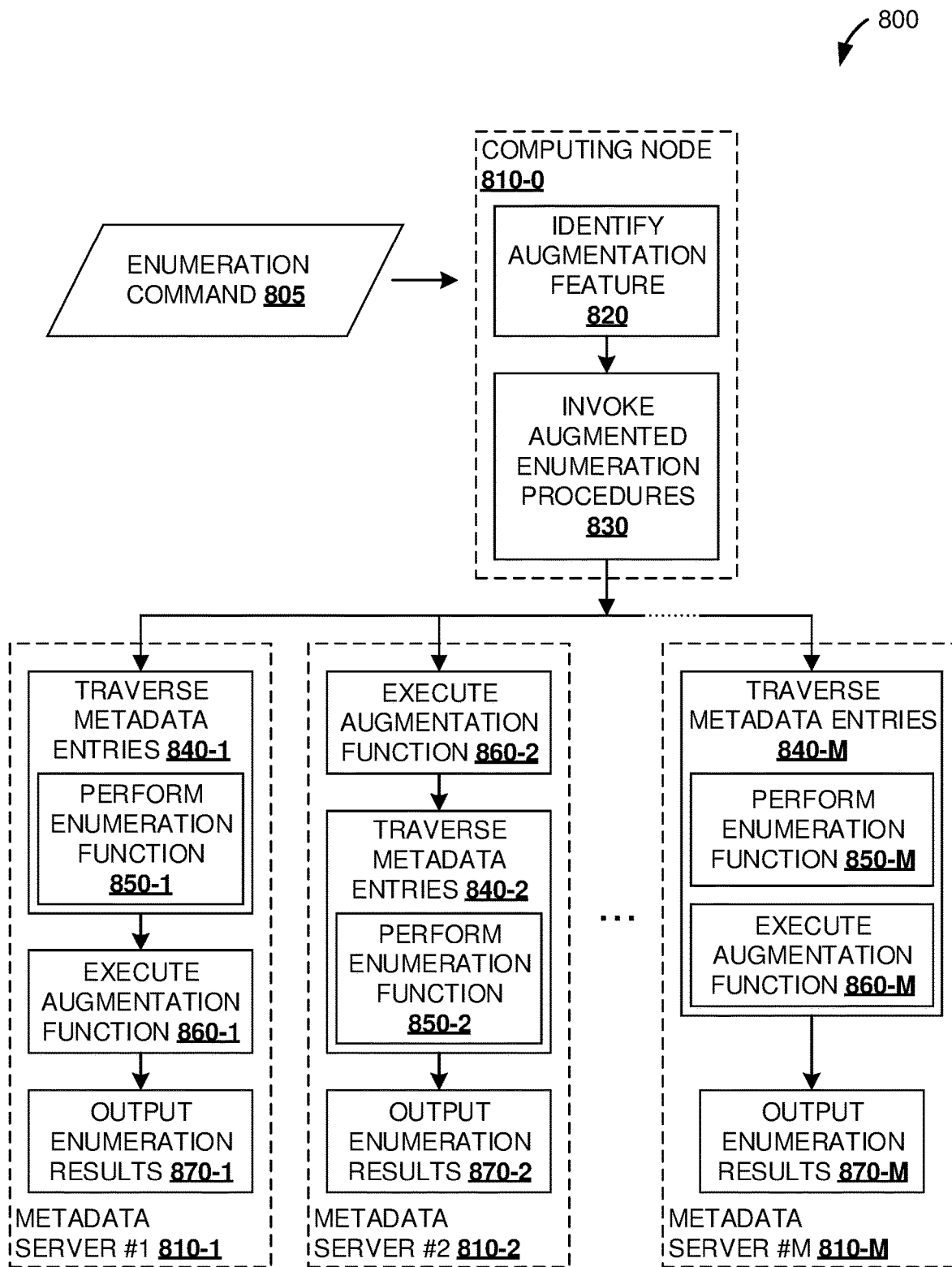
FIG. 8 is a flowchart outlining an example method for augmented enumeration of target objects in a target directory of a file system or namespace, according to disclosed technologies.

FIG. 8 is a flowchart 800 outlining an example method for augmented enumeration of target objects in a target directory of a file system or namespace. At process block 820, a computing node 810-0, which can be a primary metadata server, identifies an augmentation feature in enumeration command 805. At process block 830, computing node 810-0 invokes augmented enumeration procedures at each of a plurality metadata servers 810-1 . . . 810-M.

At process block 840-1, metadata server 810-1 traverses the metadata entries managed by metadata server 840-1, wherein each metadata entry represents a corresponding target object in the file system. The enumeration function is performed for at least one of the traversed metadata entries at process block 850-1. The augmentation feature is executed at process block 860-1. Subsequently, augmented enumeration results are outputted at process block 870-1. The operations for metadata servers 810-2 . . . 810-M are similar. For the sake of illustration, alternative ordering of the operations is shown for different metadata servers. In examples, the ordering of operations, in particular the sequential position at which the augmentation features are executed, can be the same for all sharded metadata servers 810-1 . . . 810-M.

Figure 9:
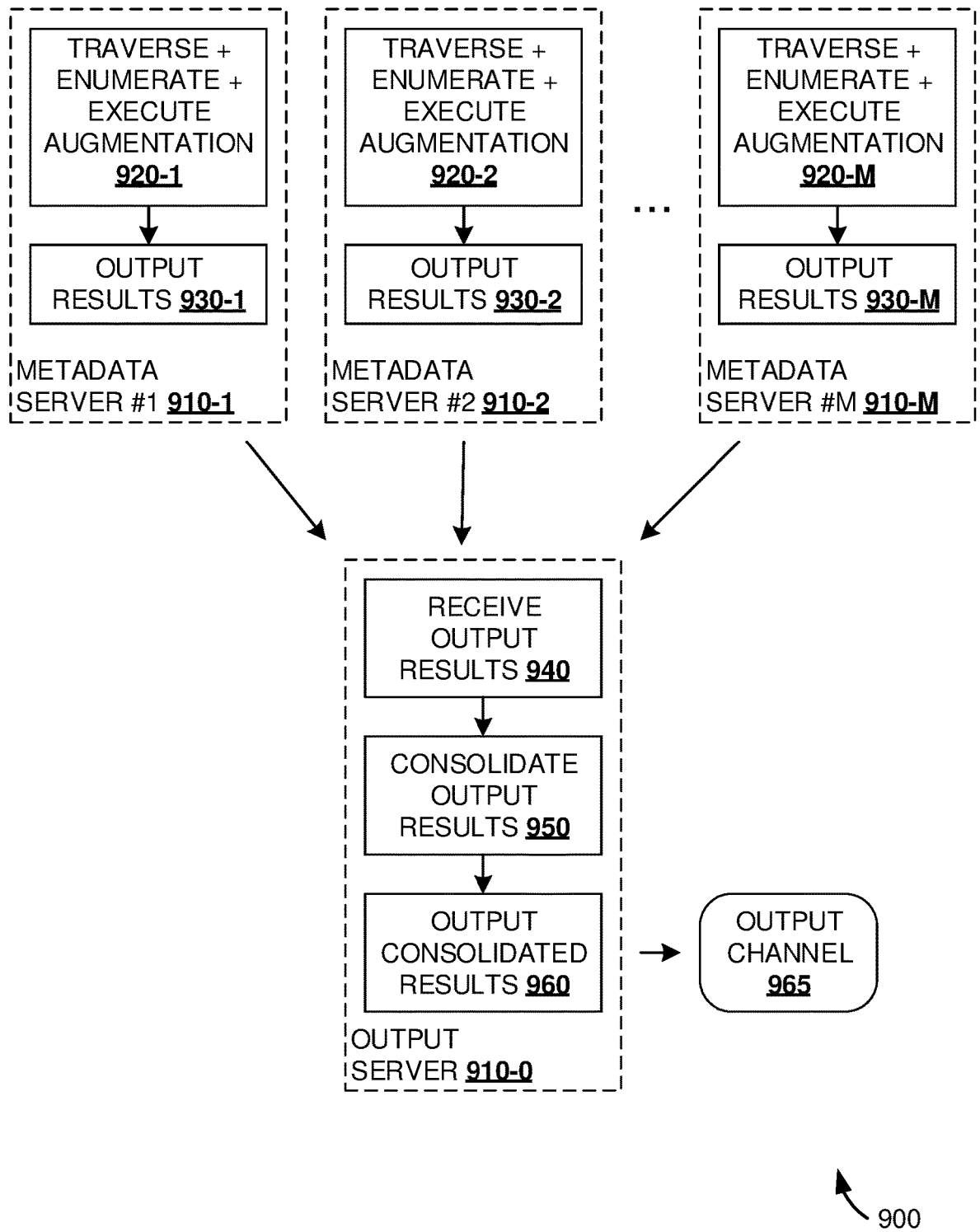
FIG. 9 is a flowchart illustrating output consolidation of enumeration results from multiple metadata servers, according to disclosed technologies.

FIG. 9 is a flowchart 900 which illustrates output consolidation of enumeration results from multiple metadata servers 910-1 . . . 910-M. At process blocks 920-1 . . . 920-M, the metadata servers 910-1 . . . 910-M complete their traversal, basic enumeration, and augmentation functions in a manner as described herein, and results are output at process blocks 930-1 . . . 930-M respectively. Output server 910-0, which can be a primary metadata server or another computing node, receives the outputs from metadata servers 910-1 . . . 910-M at process block 940, and consolidates the results at process block 950. In some examples, the results are transmitted from each metadata server 910-1 . . . 910-M and received completely at output server 910-0 prior to the consolidation at 950, while in other examples, the results are transferred and consolidated in blocks, and in still further examples, the results are transferred and consolidated in a streaming mode. The consolidated results are output from the output server at process block 960. In examples, the consolidated output is directed to output channel 965.

In this manner, a client can make a single augmented or basic enumeration request, and receive a single output object (which can be a record, a file, a stream, a data structure, or a single atomic item) instead of separate output objects from each sharded metadata server. Thus the disclosed technology and implementation of enumeration functions can be completely transparent to a requesting client, to any intermediate nodes, and even transparent to a file system front end server.

The operations of FIG. 9 can be partially or wholly integrated with the operations of FIG. 7 or 8, or with any of the other methods described herein. Further details of these and associated operations are described elsewhere in this disclosure.

XII. Additional Examples of the Disclosed Technology

The following example features can be used with any of the examples disclosed herein.

Launching of metadata server enumeration tasks can occur subsequent to initialization of the data structures associated with each metadata server. The initialized data structures can include one or more of: a pointer; an index; an entry representing: the enumeration function, an argument, a filter condition, or a task identifier; or a table.

The traversing and enumeration actions by a metadata server can commence after launching of metadata server enumeration tasks has begun. The enumeration task can comprise the actions of traversing metadata entries and performing an enumeration function on the traversed metadata entries. Two metadata servers can concurrently perform the enumeration function on the traversed metadata entries. The metadata servers can increment a respective pointer or index during the traversing action.

In examples of augmented enumeration, where the target objects are limited to less than all objects in the file system or a subtree thereof, a metadata server can skip traversal of metadata entries that do not correspond to the limited set of target objects. The metadata server can skip performing the enumeration function with metadata entries that do not represent a target object in the limited set of target objects. Limiting target objects can be based on one or more of an object attribute, an object name, an object property, an object type, or a field comprising a wildcard or a range. Performing the enumeration function on target objects comprises enumerating the target objects. Enumerating an object by a metadata server can include or be followed by generation of an output to an output channel, output device, or output destination, any of which can be a file, a host computer, a network connection, a primary metadata server, stdout, or a stream.

A method of enumerating objects represented in a directory structure can include a computer receiving a first command to enumerate objects represented in the directory structure and issuing a respective second command to each of a plurality of metadata servers to enumerate objects. A single second command sent to all of the metadata servers, or identical second commands can be sent to all of the metadata servers, or the second commands can include at least two distinct commands, or all the second commands can be different. A second command can be identical to the first command or distinct from the first commands. The second command can be formed by removing at least one item from the first command, and/or adding at least one item to the first command.

As used herein, a directory structure can be one or more of: an implementation of a POSIX-like file system, a hierarchical tree, a proper subtree of a file system, an array, table, or list of directories, or a single directory. A file system can be one or more of a POSIX-like file system, an archival file system, a block-oriented file system, a database file system, a disk file system, a distributed file system, an encrypted file system, a fault-tolerant file system, a flash file system, a flat file system, a hierarchical file system, a hybrid file system, a journaling file system, a parallel file system, a peer-to-peer file system, a proprietary file system, a pseudo-file system, a record-oriented file system, a special-purpose file system, a tape file system, a versioning file system, or a virtual file system.

As used herein, objects can include one or more of database entries, database records, directories, files, identifiers, inodes, links, network nodes, pointers, record locators, or symbolic links. Objects can be represented in a file system or a directory structure by one or more of a directory entry, a field, an inode, metadata, a pointer, a record, or a reference. A metadata entry of a file object can be a representation of a file object in the file system or directory structure. Object representations and metadata entries for an object can include one or more properties of the object, such as access permissions of the object, attributes of the object, a checksum, an error-correcting code, an identifier of the object, an inode of the object, a length of the object, a link to an associated object, a link to a metadata extension for additional data associated with the object, a location of the object, a name of the object, ownership of the object; one or more of times at which the object was archived, backed up, created, modified, or most recently accessed; a security label, or a type of the object. Additionally, one or more of these properties can be accessed or changed through an enumeration task, or (in augmented examples) used as a filter or a sort key.

Computers employed in the disclosed innovative technologies can include one or more of a primary metadata server, a file metadata server, a gateway, a virtual machine, a computing cluster, an embedded processor, a supercomputer, or a cloud computer. A metadata server can include one or more of a cloud computer, a computing cluster, an embedded processor, a file metadata server, a gateway, a supercomputer, or a virtual machine, and further can be co-located with an associated repository of file metadata, another file metadata server, a host computer, or a primary metadata server. Each metadata server incorporates or controls a respective metadata store, which can be organized as an array, a database, a list, or a table, on media including one or more of magnetic storage, optical storage, or solid-state storage. Multiple metadata servers can be situated on a single computing node.

Enumeration functions can be performed in response to a command received from a client or user, or as a maintenance activity supervised by a host computer. The command can be one or more of a POSIX command, a unix or Unix-like command, a Linux command, an encrypted command, or a proprietary file system command. The command can comprise or invoke an application; the application can be written to a POSIX application programming interface (API), or a proprietary or non-POSIX API. The command can comprise one or more flags which specify one or more of the following: a formatting directive, an interpretation of one or more arguments included in the first command, a listing scope, a preprocessing directive, a reporting directive, or a sorting directive. The command can comprise one or more arguments which specify one or more of the following: an authentication of the caller, a fully qualified file name, a partial file name, a filter, an identification of an entity from which the first command was received, a numerical parameter, a fully qualified path name, a partial path name, a pattern, or a value associated with one or more flags included in the first command. The command can be received over one or more of a bus, a wired connection, a wireless connection, an optical connection, a data link, a network link, a non-network connection, a public network, a private network, a local network, a secure network, a virtual private network, or a virtual network.

Helper structures can contain one or more of a pointer or other index, a table, or an entry representing: the enumeration function, an argument, a filter condition, or a task identifier. The index can be or can include one or more of a counter, an inode value, a name, or a pointer. Indexing structures can be or can include one or more of an array, a hash table, a linked list, or a tree.

In certain examples, a hash function is used to shard object metadata entries across file metadata servers. In some examples the output range of the hash function (this range being dubbed the hash width) can be equal to or otherwise related to the number of file metadata servers. To facilitate varying the number of file metadata servers, a hash width much greater than the actual number of file metadata servers can be used. For example, a hash width of 100,000 can be used with 100 file metadata servers, in which case 1000 output hash values are mapped to each file metadata server, with respective separate directory structures. Then, in order to increase the number of file metadata servers by Y percent, approximately Y % of the output hash values (and their respective directory structures) can be migrated from each old file metadata server to the new file metadata servers, leaving the remaining (100−Y) % of output hash values (and respective directory structures) untouched. A converse process can be used to decrease the number of file metadata servers.

Figure 10A:
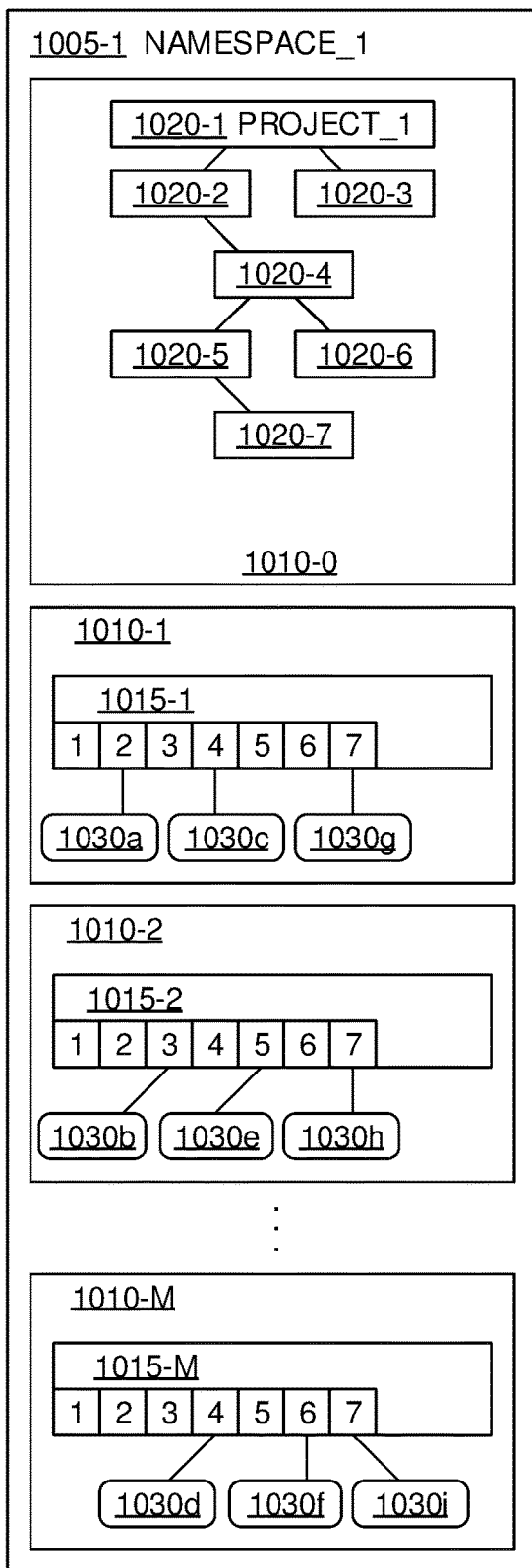
FIGS. 10A and 10B are two views of a file system showing the effect of certain operations within the file system.
Figure 10B:
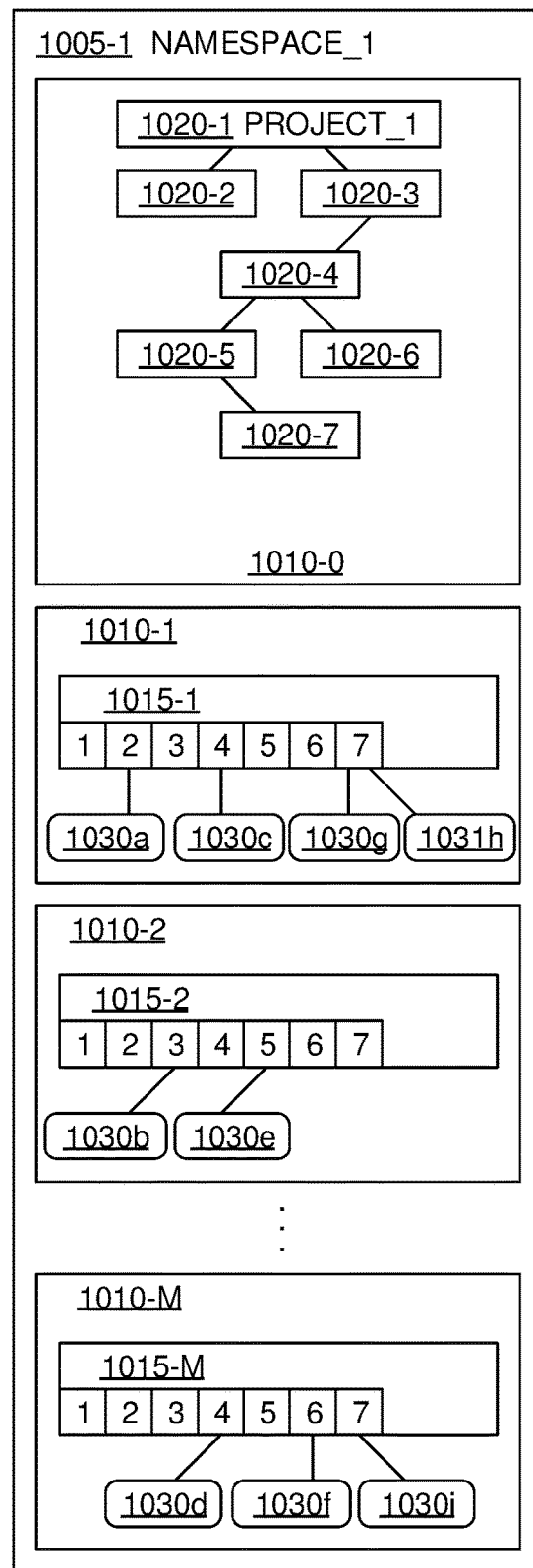

FIGS. 10A and 10B depict two views of NAMESPACE_1 1005-1 within an example file system. NAMESPACE_1 1005-1 is similar to NAMESPACE_1 105-1 depicted in FIG. 1. Referring to FIG. 10A, primary metadata server 1010-0 maintains a hierarchical directory tree having a root node PROJECT_1 1020-1, with sub-directories 1020-2 to 1020-7. Here the -I suffixes have been set to match inode values for the directories in this illustrative example. Thus directory 1020-4 has an inode value of 4, and similarly for the other directories. Each file metadata server 1010-1 . . . 1010-M maintains a respective directory structure 1015-1 . . . 1015-M with entries 1 . . . 7 for the respective inode values that have been assigned by the primary metadata server 1010-0. The metadata entries 1030a . . . 1030i for respective files are associated with their parent directories on their assigned file metadata server. For example, the metadata entry 1030a corresponds to a file in the directory having inode value 2, namely 1020-2. Further, by hashing the corresponding filename, this metadata entry has been assigned to metadata server 1010-1. FIG. 10A does not show the storage layer of the depicted file system. In certain examples, the metadata entries 1030a . . . 1030i are associated with their corresponding data objects maintained in the storage layer, in the manner shown in FIG. 1.

Turning to FIG. 10B, the effect of certain operations can be seen. First, the subtree of directory 1020-4 has been moved from old parent directory 1020-2 to new parent directory 1020-3. In certain examples, this operation has no impact on the file metadata servers. The inode value of directory 1020-4 (and all its subdirectories) remains unchanged. Thus the file metadata entries 1030a . . . 1030i remain attached to the same inode entries on their respective file metadata servers. Because filenames have not been changed in this operation, each file metadata entry remains on the same file metadata server as before.

Second, the file associated with metadata entry 1030h has been renamed, and accordingly has a new metadata entry 1031h. Because the file metadata server associated with a file is determined by hashing the filename, the corresponding metadata server can change. In this example, metadata entry 1030h was on metadata server 1010-2, whereas after renaming, metadata entry 1031h is on metadata server 1010-1. However, the file has not been moved, it remains within parent directory 1020-7 (having inode value of 7) as before. Had this file been moved to directory 1020-3, the metadata entry 1031h would now be attached to an entry for inode=3 instead.

XIII. Experimental Performance Data

A large experimental system has been deployed on a Cray XE class supercomputer with one directory metadata server, and varying numbers of file metadata servers organized four to a node. Each node is a 16-core Opteron with 32 GB of DDR3 memory; the nodes are connected, using MPI, over a Cray Gemini communications network on the Cray XE. Preliminary scaling tests of file insertion operations have been performed on this system. In the tested configuration, the file metadata servers use an in-memory file system (/tmp/shmem), and eight clients per node were configured to generate random file insertion requests to a single directory. The experimental system could also be configured to perform enumeration functions according to the disclosed technology.

Table 1 shows results for total rate of insertions achieved with varying numbers of nodes.

TABLE 1

| Number of nodes | File insertion rate [Millions/second] |
|---|---|
| 1 | 0.4 |
| 10 | 3.9 |
| 20 | 5.5 |
| 30 | 6.5 |
| 8800 | 835 |

On the largest tested system configuration, nearly a billion file insertions per second were achieved, with a total of 968 billion files in one single directory. On a per node basis, the insertion rated dropped from 0.4 M/s (here, M=million file insertions) to 0.095 M/s. This drop-off is believed to be due to the random communication pattern of the test. Enumeration functions based on ReadDir( ) as described herein are expected to have a more orderly communication pattern. Consequently, higher throughput is expected for parallelized reading of directory entries. ReadDir( ) based functions can also be implemented with read-ahead, leading to further increases in throughput. These file insertion rates were achieved without compromising latency: a query on a single file completed in less than a millisecond.

The timed test was conducted as follows. On the directory metadata server, a directory was created using mkdir, the inode was obtained, and a broadcast command was issued to all file metadata servers to create their respective entries. Upon receipt of replies from all file metadata servers, a timer was started.

To insert a new file from a client, the directory was checked for insertion permissions, and this permission was cached at each client after the first check. Then, an open was issued with a create flag for the new file. At the directory metadata server, a hash on the filename was performed to determine which file metadata server to route the open request to; the open was forwarded to that file metadata server and a reply was received, followed (in these tests) by a close command to the same file metadata server, and its ensuing reply. Thus, files were inserted one at a time into the logical directory, with random requests from all clients to all file metadata servers, and two round-trip messages for each file insertion. At the conclusion of the test, the timer was stopped and the results recorded.

Directory listing operations were also tested, on a system with 50 nodes (totaling 400 metadata servers) and 100 million files in a single directory. For a single process successively querying all metadata servers, the directory listing performance was 700 thousand files per second, while with all metadata servers queried in parallel, an aggregate rate of 303 million listings per second was achieved.

XIV. Applications

The disclosed technology can be implemented internally within a file system, and transparently to clients and users. Thus, the client interface can be left unchanged, and a wide variety of file systems and applications can readily derive the benefits of scalable operations as described herein. In particular examples, the disclosed technologies are applicable to POSIX-compliant file systems and POSIX-like file systems. Some disclosed technologies have been implemented within a MarFS file system, and ports to Orange FS, I/O Forwarding Scalability Layer with tmpfs, and IndexFS are contemplated. In other examples, the disclosed technologies are applicable to any file system, and are particularly beneficial to hierarchical, distributed, and parallel file systems.

The disclosed technology is also extensible to parallelization of additional metadata operations, and are not limited to enumeration functions. Potentially applicable functions include mkdir, rmdir, opendir, readdir, closedir, stat, unlnk, seekdir, and/or open-with-create.

Furthermore, the disclosed technology is not limited to file systems, but can also be applied to other fields where large numbers of records or data items require enumeration and/or traversal. Such fields may include databases, such as hierarchical databases, XML databases, graph databases, grid databases, image databases, multimedia databases (including audio and video), geographic information systems databases, library catalogs, document-oriented databases, and relational databases. Such fields may further include various classes of networks, including internet-of-things, mobile networks, sensor clouds, smart dust, transportation networks, smart roadway networks, power distribution networks, ad hoc networks, neural networks, biological networks, social networks, and genealogy networks.

XV. Example Computing Environment

Figure 11:
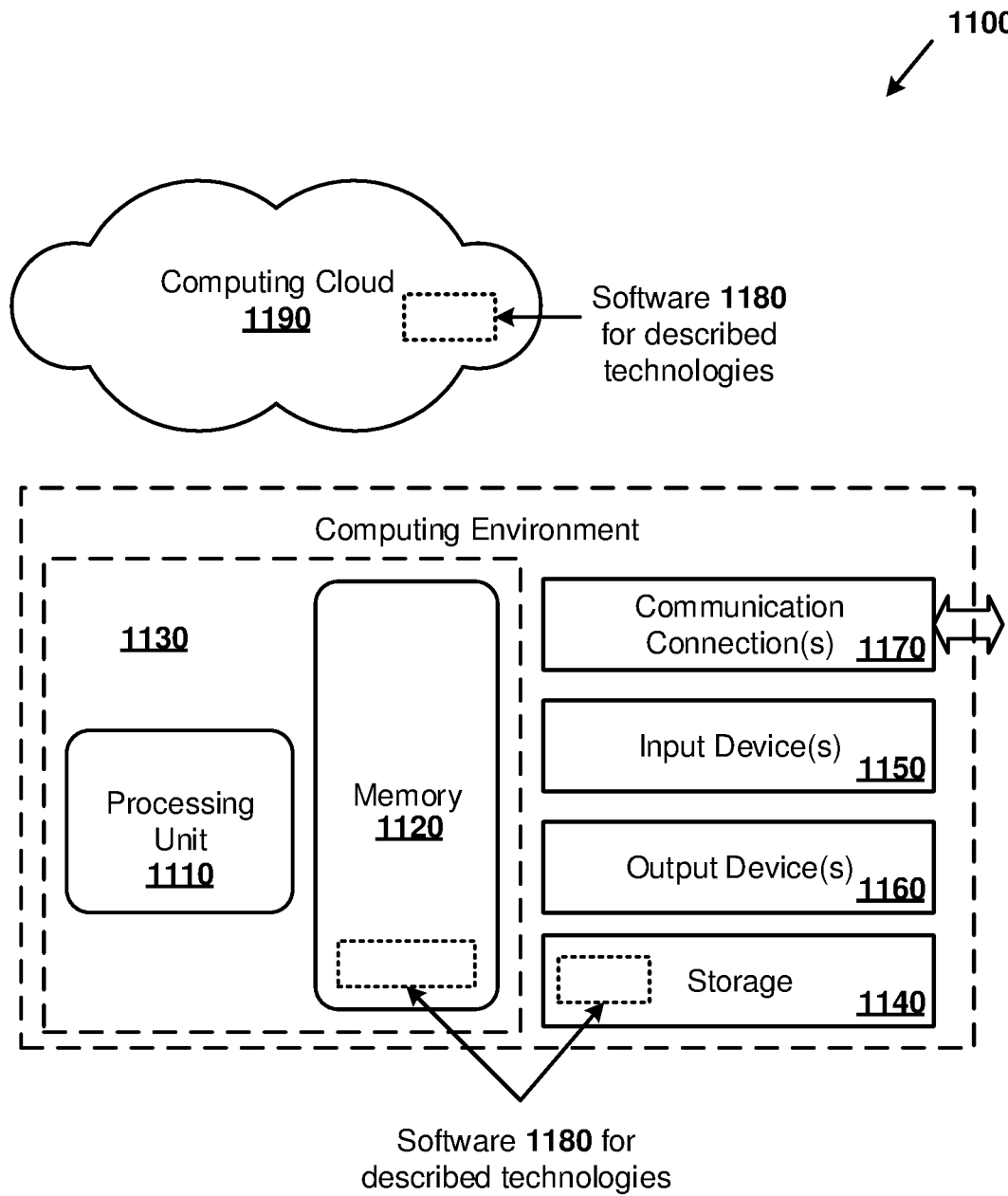
FIG. 11 illustrates a generalized example of a suitable computing environment in which described embodiments, techniques, and technologies, including performing enumeration functions, can be implemented.

FIG. 11 illustrates a generalized example of a suitable computing environment 1100 in which described examples, techniques, and technologies, including enumeration of objects in a file system or a directory structure, can be implemented. For example, the computing environment 1100 can implement all of the functions described with respect to FIGS. 1-10, as described herein. Particularly, the computing environment can implement a primary metadata server or a secondary (sharded) metadata server.

The computing environment 1100 is not intended to suggest any limitation as to scope of use or functionality of the technology, as the technology can be implemented in diverse general-purpose or special-purpose computing environments. For example, the disclosed technology can be implemented with other computer system configurations, including hand held devices, multiprocessor systems, microprocessor-based or programmable consumer electronics, network PCs, minicomputers, mainframe computers, and the like. The disclosed technology can also be practiced in distributed computing environments where tasks are performed by remote processing devices that are linked through a communications network. In a distributed computing environment, program modules can be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and can be a real or a virtual processor. In a multi-processing system, multiple processing units execute computer-executable instructions to increase processing power and as such, multiple processors can be running simultaneously. The memory 1120 can be volatile memory (e.g., registers, cache, RAM), non-volatile memory (e.g., ROM, EEPROM, flash memory, etc.), or some combination of the two. The memory 1120 stores software 1180, images, and video that can, for example, implement the technologies described herein. A computing environment can have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100. The terms computing environment, computing node, computing system, and computer are used interchangeably.

The storage 1140 can be removable or non-removable, and includes magnetic disks, magnetic tapes or cassettes, CD-ROMs, CD-RWs, DVDs, or any other medium which can be used to store information and that can be accessed within the computing environment 1100. The storage 1140 stores instructions for the software 1180 and measurement data, which can implement technologies described herein.

The input device(s) 1150 can be a touch input device, such as a keyboard, keypad, mouse, touch screen display, pen, or trackball, a voice input device, a scanning device, or another device, that provides input to the computing environment 1100. The input device(s) 1150 can also include interface hardware for connecting the computing environment to control and receive data from host and client computers, storage systems, measurement acquisition components, control excitation sources, or to display or output data processed according to methods disclosed herein, including data acquisition systems coupled to a plurality of sensors.

For audio, the input device(s) 1150 can be a sound card or similar device that accepts audio input in analog or digital form, or a CD-ROM reader that provides audio samples to the computing environment 1100. The output device(s) 1160 can be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, video, or other data in a modulated data signal.

Some examples of the disclosed methods can be performed using computer-executable instructions implementing all or a portion of the disclosed technology in a computing cloud 1190. For example, collection of measurement data can be executed in the computing environment (e.g., by a measurement acquisition component), while analysis of the measurement data can be performed on remote servers located in the computing cloud 1190.

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes the media for data storage such as memory 1120 and storage 1140, and not transmission media such as modulated data signals.

XVI. General Considerations

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "apply," "estimate," "analyze," "identify," "instruct," and "determine" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Common Lisp, Dylan, Erlang, Fortran, Go, Haskell, Java, Julia, Python, Scheme, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Having described and illustrated the principles of our innovations in the detailed description and accompanying drawings, it will be recognized that the various examples can be modified in arrangement and detail without departing from such principles.

In view of the many possible examples to which the principles of the disclosed technology can be applied, it should be recognized that the illustrated examples are only preferred examples and should not be taken as limiting the scope of the disclosed technology. Rather, the scope of the claimed subject matter is defined by the following claims. I therefore claim as my invention all that comes within the scope of these claims.

I claim:

1. A method comprising:
   by a computer:
      maintaining a hierarchical directory tree headed by a root node of a namespace of a file system, the directory tree comprising directories and files, wherein metadata entries of the files and directories are sharded across a plurality of metadata servers;
      receiving, from a client, a first command to perform an augmented enumeration function for the file system, wherein the first command indicates sorting to be performed as an augmentation feature to a basic enumeration function; and
      responsive to the first command, invoking parallel augmented enumeration tasks at respective servers of the plurality of metadata servers;
   by each of the metadata servers, executing a respective task of the parallel augmented enumeration tasks by:
      traversing, in one pass, a plurality of respective hierarchically-organized metadata entries, the plurality of metadata entries representing corresponding distinct target directories and/or distinct target files among the directories and files of the directory tree;
      performing the basic enumeration function for at least two of the traversed metadata entries to obtain a plurality of metadata entities;
      executing the sorting on the obtained metadata entities during the one traversing pass; and
      outputting one or more results of the sorting on the obtained metadata entities.

2. The method of claim 1, wherein the augmentation feature further comprises a filter limiting the target directories and/or target files to be enumerated.

3. The method of claim 2, wherein the basic enumeration function is performed for a first traversed metadata entry whose corresponding first target object, among the target directories and/or target files, satisfies the filter, and wherein the basic enumeration function is not performed for a second traversed metadata entry whose corresponding second target object, among the target directories and/or target files, does not satisfy the filter.

4. The method of claim 2, further comprising, by each of the metadata servers, and prior to the invoking:
   populating an auxiliary index structure to facilitate identification of metadata entries for the target directories and/or target files satisfying the filter;
   wherein the traversing comprises accessing the auxiliary index structure to identify successive metadata entries.

5. The method of claim 1, wherein the sorting specifies an output ordering of results of the basic enumeration function.

6. The method of claim 1, wherein the executing the sorting comprises:
   storing the obtained plurality of metadata entries in a balanced binary tree.

7. The method of claim 1, further comprising:
   by the computer, opening a target directory containing one or more of the target directories and/or target files;
   by at least one metadata server, opening a portion of the target directory associated with the at least one metadata server;

by the computer, instructing the at least one metadata server to close the respective portion of the target directory; and by the at least one metadata server, closing the portion of the target directory.

8. The method of claim 1, wherein the traversing action, by a first one of the metadata servers, further comprises:
 (a) accessing an indexing structure maintained by the first metadata server, to locate a first metadata entry of the respective metadata entries;
 (b) accessing the located first metadata entry;
 (c) traversing the indexing structure to locate a next metadata entry; and
 (d) repeating steps (b) and (c) until no next metadata entry is located.

9. The method of claim 1, wherein a first of the traversed metadata entries represents a first target object among the target directories and/or target files, and wherein performing the basic enumeration function on the first traversed metadata entry comprises:
 adding the disk usage of the first target object to a sum, changing one or more properties of the first target object, counting the first target object,
 deleting the first target object, or
 listing the first target object.

10. The method of claim 1, further comprising, by the computer:
 receiving the outputted one or more results from each of the metadata servers;
 consolidating the received results; and
 outputting the consolidated results to the client.

11. The method of claim 1, wherein the parallel augmented enumeration tasks are independent of each other.

12. A computer-implemented system comprising:
 a plurality of metadata servers, comprising:
  a primary metadata server configured to maintain a hierarchical directory tree headed by a root node of a namespace within a file system, the file system comprising directories and files; and
  two or more secondary metadata servers configured to maintain distinct non-overlapping collections of metadata of the file system;
 wherein each of the plurality of metadata servers comprises one or more processors, memory coupled thereto, and one or more network adapters, the plurality of metadata servers being interconnected by one or more network connections and configured to perform a method comprising:
 by the primary metadata server:
  receiving a first command to perform an augmented enumeration function, wherein the first command indicates an augmentation of a basic enumeration function on a file system;
  responsive to the first command, launching parallel augmented enumeration tasks at each of the secondary metadata servers
 by each secondary metadata server, responsive to the launching:
  traversing, in one pass, a plurality of respective hierarchically-organized metadata entries, the metadata entries representing corresponding distinct target objects among the directories and files of the file system;
  during the one traversing pass, performing the basic enumeration function and executing the augmentation feature on a plurality of the traversed metadata entries to obtain a plurality of metadata entities; and
  outputting one or more results of the augmented enumeration function.

13. The computer-implemented system of claim 12, wherein the method further comprises, prior to receiving the first command:
 by the primary metadata server:
  responsive to receiving a second command to add a file entry at a first target location in the file system:
   associating the file entry with a first of the secondary metadata servers; and
   sending a communication to the first secondary metadata server related to the file entry; and
 by the first secondary metadata server, responsive to the communication:
  determining an inode value for the file entry;
  storing a first metadata entry associated with the file entry in a metadata store directly controlled by the first secondary metadata server; and
  populating an auxiliary index structure with a second entry, distinct from the first metadata entry, and associated with the file entry;
  wherein the executing uses the index structure to selectively determine the respective metadata entries that are traversed.

14. The computer-implemented system of claim 12, further comprising an output channel, and wherein the method further comprises, by a computer:
 receiving the outputted one or more results from each of the secondary metadata servers;
 consolidating the received results; and
 outputting the consolidated results on the output channel.

15. One or more computer-readable storage media storing a plurality of instructions that, when executed by one or more processors, cause the processors to perform a method comprising:
 at a first computing node:
  responsive to a first command to perform an enumeration function, identifying an augmentation feature associated with the first command; and
  invoking parallel augmented enumeration procedures at respective ones of a plurality of metadata servers, wherein the metadata servers manage respective portions of metadata entries of a file system and the first computing node is configured to maintain a hierarchical directory tree headed by a root node of the file system; and
 at each of two or more of the metadata servers:
  traversing, in one pass, the metadata entries hierarchically organized and managed respectively by each of the two or more metadata servers;
  performing the enumeration function for a plurality of the traversed metadata entries to obtain a plurality of metadata entities;
  executing the augmentation feature by sorting the plurality of metadata entities during the one traversing pass; and
  outputting one or more augmented enumeration results.

16. The one or more computer-readable storage media of claim 15, wherein the portions of the file system metadata entries managed by the metadata servers are part of a common namespace within the file system.

* * * * *